(12) United States Patent
Foulger et al.

(10) Patent No.: US 8,266,242 B2
(45) Date of Patent: Sep. 11, 2012

(54) METHOD, SYSTEM, AND COMPUTER PROGRAM PRODUCT FOR PROPAGATING REMOTELY CONFIGURABLE POSTERS OF HOST SITE CONTENT

(75) Inventors: Michael G. Foulger, Novato, CA (US); Peter B. van Gorder, Sebastopol, CA (US)

(73) Assignee: Archeron Limited L.L.C., Wilmington, DE (US)

( * ) Notice: Subject to any disclaimer, the term of this patent is extended or adjusted under 35 U.S.C. 154(b) by 883 days.

(21) Appl. No.: 11/436,094

(22) Filed: May 18, 2006

(65) Prior Publication Data

US 2007/0204219 A1 Aug. 30, 2007

Related U.S. Application Data

(63) Continuation of application No. 09/551,746, filed on Apr. 18, 2000, now abandoned.

(51) Int. Cl.
*G06F 15/16* (2006.01)
*G06F 17/00* (2006.01)

(52) U.S. Cl. ......... 709/217; 709/227; 715/205; 715/209

(58) Field of Classification Search ........... 709/217, 709/227; 715/205, 209
See application file for complete search history.

(56) References Cited

U.S. PATENT DOCUMENTS

| | | | |
|---|---|---|---|
| 5,107,443 A | 4/1992 | Smith et al. | |
| 5,164,897 A | 11/1992 | Clark et al. | |
| 5,265,033 A | 11/1993 | Vajk et al. | |
| 5,321,835 A | 6/1994 | Tanaka et al. | |
| 5,414,845 A | 5/1995 | Behm et al. | |
| 5,457,797 A | 10/1995 | Butterworth et al. | |
| 5,532,838 A | 7/1996 | Barbari | |
| 5,551,024 A | 8/1996 | Waters | |
| 5,583,995 A | 12/1996 | Gardner et al. | |
| 5,706,502 A * | 1/1998 | Foley et al. | 707/10 |
| 5,781,901 A | 7/1998 | Kuzma | |

(Continued)

FOREIGN PATENT DOCUMENTS

EP     0 989 501 A2     3/2000

(Continued)

OTHER PUBLICATIONS

Lance Spitzner, "What is MD5 and Why Do I Care?," http://www.enteract.com/~lspitz/md5.html (downloaded Mar. 30, 2000), 2 pages.

(Continued)

*Primary Examiner* — Ranodhi Serrao
(74) *Attorney, Agent, or Firm* — Sterne, Kessler, Goldstein & Fox P.L.L.C.

(57) ABSTRACT

A method, system, and computer readable medium for propagating a poster of host site content to remote clients over the World Wide Web includes hosting a configuration session at a host site, in real time, including receiving input from a remote client to configure at the host site a propagative poster of host site content based on at least one configuration selection input by the remote client; generating a propagative poster identifier that references the propagative poster; generating a Web code segment that includes the propagative poster identifier and a link to the host site; and forwarding the Web code segment to the remote client, wherein the Web code segment is configured to be inserted into a Web page of the remote client, to create a propagative poster on the Web page of the remote client.

57 Claims, 23 Drawing Sheets

U.S. PATENT DOCUMENTS

| | | | |
|---|---|---|---|
| 5,793,972 | A | 8/1998 | Shane |
| 5,796,952 | A | 8/1998 | Davis et al. |
| 5,799,309 | A | 8/1998 | Srinivasan |
| 5,808,566 | A | 9/1998 | Behr |
| 5,812,843 | A | 9/1998 | Yamazaki |
| 5,818,447 | A | 10/1998 | Wolf et al. |
| 5,832,497 | A | 11/1998 | Taylor |
| 5,850,618 | A | 12/1998 | Suetsugu et al. |
| 5,870,552 | A | 2/1999 | Dozier et al. |
| 5,870,604 | A | 2/1999 | Yamagishi |
| 5,875,175 | A | 2/1999 | Sherer et al. |
| 5,908,465 | A | 6/1999 | Ito et al. |
| 5,933,811 | A | 8/1999 | Angles et al. |
| 5,937,162 | A | 8/1999 | Funk et al. |
| 5,966,695 | A | 10/1999 | Melchione et al. |
| 5,970,062 | A | 10/1999 | Bauchot |
| 5,978,799 | A | 11/1999 | Hirsch |
| 5,999,912 | A | 12/1999 | Wodarz et al. |
| 6,006,225 | A | 12/1999 | Bowman et al. |
| 6,009,455 | A | 12/1999 | Doyle |
| 6,009,462 | A | 12/1999 | Birrell |
| 6,018,518 | A | 1/2000 | Smallwood et al. |
| 6,021,406 | A | 2/2000 | Kuznetsov |
| 6,031,533 | A | 2/2000 | Peddada et al. |
| 6,049,776 | A | 4/2000 | Donnelly et al. |
| 6,055,510 | A | 4/2000 | Henrick et al. |
| 6,070,190 | A | 5/2000 | Reps et al. |
| 6,073,075 | A | 6/2000 | Kondou et al. |
| 6,085,244 | A | 7/2000 | Wookey |
| 6,091,777 | A | 7/2000 | Guetz et al. |
| 6,094,507 | A | 7/2000 | Monden |
| 6,101,485 | A | 8/2000 | Fortenberry et al. |
| 6,170,011 | B1 | 1/2001 | Macleod Beck et al. |
| 6,182,129 | B1 * | 1/2001 | Rowe et al. ............... 709/221 |
| 6,188,398 | B1 | 2/2001 | Collins-Rector et al. |
| 6,222,825 | B1 | 4/2001 | Mangin et al. |
| 6,233,520 | B1 | 5/2001 | Ito et al. |
| 6,256,627 | B1 | 7/2001 | Beattie et al. |
| 6,263,020 | B1 | 7/2001 | Gardos et al. |
| 6,275,575 | B1 | 8/2001 | Wu |
| 6,282,540 | B1 * | 8/2001 | Goldensher et al. ............ 707/6 |
| 6,289,340 | B1 | 9/2001 | Puram et al. |
| 6,321,265 | B1 | 11/2001 | Najork et al. |
| 6,346,980 | B1 | 2/2002 | Tani et al. |
| 6,351,755 | B1 | 2/2002 | Najork et al. |
| 6,353,845 | B1 | 3/2002 | Torzewski et al. |
| 6,360,254 | B1 | 3/2002 | Linden et al. |
| 6,363,377 | B1 | 3/2002 | Kravets et al. |
| 6,377,936 | B1 | 4/2002 | Henrick et al. |
| 6,381,579 | B1 * | 4/2002 | Gervais et al. ............... 705/8 |
| 6,397,219 | B2 | 5/2002 | Mills |
| 6,401,075 | B1 | 6/2002 | Mason et al. |
| 6,446,111 | B1 * | 9/2002 | Lowery ............... 709/203 |
| 6,449,635 | B1 | 9/2002 | Tilden, Jr. et al. |
| 6,462,676 | B1 | 10/2002 | Koizumi |
| 6,466,940 | B1 | 10/2002 | Mills |
| 6,523,021 | B1 | 2/2003 | Monberg et al. |
| 6,539,080 | B1 | 3/2003 | Bruce et al. |
| 6,549,950 | B2 | 4/2003 | Lytle et al. |
| 6,556,919 | B2 | 4/2003 | Suzuki et al. |
| 6,560,243 | B1 | 5/2003 | Mogul |
| 6,578,022 | B1 | 6/2003 | Foulger et al. |
| 6,587,832 | B1 | 7/2003 | Beck et al. |
| 6,594,666 | B1 | 7/2003 | Biswas et al. |
| 6,606,613 | B1 | 8/2003 | Altschuler |
| 6,606,660 | B1 * | 8/2003 | Bowman-Amuah ......... 709/227 |
| 6,618,747 | B1 | 9/2003 | Flynn et al. |
| 6,625,581 | B1 | 9/2003 | Perkowski |
| 6,657,558 | B2 | 12/2003 | Horita et al. |
| 6,662,194 | B1 | 12/2003 | Joao |
| 6,668,281 | B1 | 12/2003 | Ayyadurai |
| 6,681,255 | B1 | 1/2004 | Cooper et al. |
| 6,694,353 | B2 | 2/2004 | Sommerer |
| 6,721,759 | B1 | 4/2004 | Rising |
| 6,721,784 | B1 | 4/2004 | Leonard et al. |
| 6,727,927 | B1 | 4/2004 | Dempski et al. |
| 6,751,606 | B1 | 6/2004 | Fries et al. |
| 6,766,348 | B1 | 7/2004 | Combs et al. |
| 6,785,679 | B1 | 8/2004 | Dane et al. |
| 6,791,943 | B1 | 9/2004 | Reynolds |
| 6,829,764 | B1 | 12/2004 | Cohen et al. |
| 6,829,780 | B2 | 12/2004 | Kraft et al. |
| 6,854,007 | B1 | 2/2005 | Hammond |
| 7,007,010 | B2 | 2/2006 | Cooper |
| 7,047,423 | B1 | 5/2006 | Maloney et al. |
| 7,065,555 | B2 | 6/2006 | Foulger et al. |
| 7,072,888 | B1 | 7/2006 | Perkins |
| 7,103,580 | B1 | 9/2006 | Batachia et al. |
| 7,287,271 | B1 * | 10/2007 | Riggins ............... 726/3 |
| 7,383,355 | B1 | 6/2008 | Berkman et al. |
| 7,386,594 | B2 | 6/2008 | Foulger et al. |
| 7,401,122 | B2 | 7/2008 | Chen |
| 7,401,155 | B2 | 7/2008 | Cooper et al. |
| 7,469,405 | B2 | 12/2008 | Foulger et al. |
| 7,475,346 | B1 * | 1/2009 | Bullock et al. ............... 709/203 |
| 7,693,950 | B2 | 4/2010 | Foulger et al. |
| 7,740,008 | B2 | 6/2010 | Foulger et al. |
| 7,783,621 | B2 | 8/2010 | Cooper |
| 7,949,748 | B2 | 5/2011 | Cooper et al. |
| 8,015,047 | B2 | 9/2011 | Foulger et al. |
| 8,055,605 | B2 | 11/2011 | Foulger et al. |
| 2001/0011226 | A1 | 8/2001 | Greer et al. |
| 2001/0020195 | A1 | 9/2001 | Patel et al. |
| 2001/0039508 | A1 | 11/2001 | Nagler et al. |
| 2001/0042000 | A1 | 11/2001 | Defoor, Jr. |
| 2001/0047297 | A1 * | 11/2001 | Wen ............... 705/14 |
| 2001/0054043 | A1 | 12/2001 | Harlan |
| 2002/0004733 | A1 | 1/2002 | Addante |
| 2002/0004753 | A1 | 1/2002 | Perkowski |
| 2002/0016730 | A1 | 2/2002 | Foulger et al. |
| 2002/0016809 | A1 | 2/2002 | Foulger et al. |
| 2002/0032738 | A1 | 3/2002 | Foulger et al. |
| 2002/0059226 | A1 | 5/2002 | Cooper |
| 2002/0073343 | A1 | 6/2002 | Ziskind et al. |
| 2002/0082923 | A1 | 6/2002 | Merriman et al. |
| 2002/0103698 | A1 | 8/2002 | Cantrell |
| 2002/0147637 | A1 | 10/2002 | Kraft et al. |
| 2002/0152238 | A1 | 10/2002 | Hayes |
| 2002/0156779 | A1 | 10/2002 | Elliott et al. |
| 2003/0037158 | A1 | 2/2003 | Yano et al. |
| 2003/0046148 | A1 | 3/2003 | Rizzi et al. |
| 2003/0128297 | A1 | 7/2003 | Chu |
| 2003/0140172 | A1 | 7/2003 | Woods et al. |
| 2003/0145100 | A1 | 7/2003 | Marchetto et al. |
| 2003/0229638 | A1 | 12/2003 | Carpenter et al. |
| 2004/0010484 | A1 | 1/2004 | Foulger et al. |
| 2004/0210589 | A1 | 10/2004 | Cooper et al. |
| 2004/0220821 | A1 | 11/2004 | Ericcson et al. |
| 2005/0171863 | A1 | 8/2005 | Hagen |
| 2005/0283503 | A1 | 12/2005 | Hancock et al. |
| 2005/0289005 | A1 | 12/2005 | Ferber et al. |
| 2006/0085263 | A1 | 4/2006 | Greer et al. |
| 2006/0129536 | A1 | 6/2006 | Foulger et al. |
| 2007/0016562 | A1 | 1/2007 | Cooper |
| 2007/0022170 | A1 | 1/2007 | Foulger et al. |
| 2007/0150804 | A1 | 6/2007 | Foulger et al. |
| 2007/0204219 | A1 | 8/2007 | Foulger et al. |
| 2008/0244027 | A1 | 10/2008 | Foulger et al. |
| 2008/0270604 | A1 | 10/2008 | Cooper et al. |
| 2009/0094541 | A1 | 4/2009 | Foulger et al. |
| 2010/0223275 | A1 | 9/2010 | Foulger et al. |

FOREIGN PATENT DOCUMENTS

| | | |
|---|---|---|
| JP | 07200509 | 8/1995 |
| JP | 08221479 A | 8/1996 |
| JP | 09130861 | 5/1997 |
| JP | 2000020421 | 1/2000 |
| WO | WO 97/07467 | 2/1997 |
| WO | PCT/US97/19719 A2 | 10/1997 |
| WO | WO 98/20434 | 5/1998 |
| WO | PCT/US97/22151 | 6/1998 |
| WO | WO 98/29696 A1 | 6/1998 |
| WO | WO 00/20975 | 4/2000 |
| WO | WO 00/25508 | 5/2000 |
| WO | WO 01/13069 A1 | 2/2001 |
| WO | WO 01/65426 A1 | 9/2001 |
| WO | WO 01/80177 A2 | 10/2001 |

OTHER PUBLICATIONS

R. Rivest, "The MD5 Message-Digest Algorithm," Request for Comments 1321, Network Working Group, MIT Laboratory for Computer Science and RSA Data Security, Inc., Apr. 1992; http://www.cis.ohio-state.edu/rfc/rfc1321.txt, (downloaded Mar. 30, 2000); pp. 19.

Bruce Schneier, "*Applied Cryptography* (Second Edition)," John Wiley & Sons, Inc., 1996, pp. vii-xiv and 352-355.

Business Wire, "Google Launches Full Suite of Fully, Automated, Highly Customizable Websearch Services Based on Company's Award-Winning Search Technology," Apr. 4, 2000, pp. 1-3.

RSS Feeds From CNET News.com/CNET News.com http://news.com/2009-1090-980549.html?tag=ne.404 (downloaded May 15, 2006—3 pgs).

http://www.weather.com/services/oap.html?from=servicesindex downloaded May 18, 2006.

Gauch, S. and Smith, John. "Query Reformulation Strategies for an Intelligent Search Intermediary" Proceedings of the AI Systems in Government Conference, IEEE Computer Society ISBN No. 0-8186-1934-1 pp. 65-71 (Mar. 27-31, 1989).

Hsiangchu, Lai et al. A System Architecture of Intelligent-Guided Browsing on the Web, 1998, IEEE, 1060-3425, 1-10.

Jin-gang Kim et al., Intelligent Information Recommend System on the Internet, 1999, IEEE.

Branscum, Deborah "Sites to Help Professional Workers Who Like to Go it Alone", New York Times, Oct. 14, 1999, [retrieved Jun. 23, 2005 from Proquest Direct, pp. 1-3.

Houston, Lori, "IC Planet: Running Perl in the Engine", www.oreilly.com Apr. 10, 2000 [retrieved May 23, 2005 from Google.com p. 1-2].

Clark, Don "E-Business Starting Gate" Wall Street Journal Apr. 24, 2000 [retrieved Jun. 23, 2005 from Proquest Direct p. 1-3].

IBM Technical Disclosure Bulletin, NN8905154, May 1989 2 pgs.

International Search report for Application No. PCT/US01 12648 Nov. 21, 2001, 6 pgs.

Anderson, D., "E-mail or Me-Mail?" The Industry Standard, IDG.net, Printed from http://www.thestandard/com/article/display/0,1151,12422,00.html, 4 pages (Mar. 6, 2000).

Cross, R. and Nassef, A., "E-Mail Direct Marketing Comes of Age," Direct Marketing, Hoke Communications, vol. 62, No. 6, pp. 44-45 (Oct. 1999).

"Top Ten Strategies for Direct Email Success," Boldfish Corporation, Printed from http://www.boldfish.com/BF-emguide/top-ten.html, 7 pages (Jan. 1, 2000).

English-Language Abstract of Japanese Patent Publication No. 2000020421, European Patent Office, 1 page (Jan. 21, 2000—Date of publication of application).

International Search Report from PCT Application No. PCT/US01/13137, 7 pages, mailed Aug. 28, 2002.

International Search Report from Application No. PCT/US01/13141, 7 pages, mailed Oct. 27, 2003.

Sanad et al. Mobile cellular/GPS/satellite antennas with both single-band and dual-band, Antennas and Propagation Society International Symposium, Jul. 16-20, 2000.

Nagy et al. Geographic Data Processing. ACM Computing Surveys. 1979, p. 139-181.

International Search report for Application No. PCT/US01 12510 Apr. 18, 2001, 6 pgs mailed Sep. 5, 2002.

Ju, J and Wang Y., "Scheduling PVM Tasks," XP000627434, Operating Systems Review (SIGOPS), ACM Headquarter, New York, NY, vol. 30, No. 3, Jul. 1, 1996, pp. 22-31.

"Mental Ray Specification," XP002195542, <http://www.id8media.com/3s_products/mental_ray2.htm>,[internet], retrieved on Apr. 8, 2002.

Taylor, A., "Press Release—Avid Announces New Release of softimage^3d 3.8sp2," XP002195543, <http://www.softimage.com/community/xsi/discuss/Archives/3dgames.archive.9907/msg0000.htm>, [internet], retrieved on Apr. 8, 2002.

Ganesh, Sathy, Google Groups, "Re: Group Scheduling Software for PC's and mac's", Sep. 22, 1994, Newsgroups: bit.listserv.novell.

Foulger, Michael G., et al. U.S. Appl. No. 09/551,746, filed Apr. 18, 2000 entitled "Method, System, and Computer Program Product for Propagating Remotely Configurable Posters of Host Site Content".

Antonioletti, Mario "Load Sharing Across Networked Computers", Dec. 1997, The University of Ediburgh, version 1.0, p. 1-34.

"404 Error page/ CNET News.com" http://news.com/2547-1%203-0-20-.xml (downloaded May 18, 2006) 3 pages.

International Preliminary Examination Report for PCT Application No. PCT/US01/13265, 8 pages, mailed Apr. 22, 2008.

International Search Report for PCT Appl. No. PCT/US01/12509, 3 pages, mailed Oct. 12, 2003.

U.S. Appl. No. 60/180,368, Carpenter et al., "Method and Apparatus for Providing Access to Online Employment Information", filed Feb. 4, 2000.

U.S. Appl. No. 60/199,376, Foulger et al., "Method, System, and Computer Program Product for Employment Market Statistics Generation and Analysis", filed Apr. 25, 2000.

Costes, M., et al., "Link Bandwidth Control Using a Hardware Pacing Mechanism", IBM Technical Disclosure Bulletin, May 1989, accessed from ip.com; pp. 1-3.

"Expedia Travel", expedia.msn.com/daily/home/default.hts from Dec. 1998, accessed Jan. 29, 2011 via Archive.org; 6 pages.

Holzer, H., et al., "Jobs Queues and Wages", The Quarterly Journal of Economics, Aug. 1991; pp. 739-766.

Loban, S. R., "A Framework for Computer Assisted Travel Counseling", Annals of Toursim Research, vol. 24, No. 4, 1997; pp. 813-834.

Pischke, J., et al., "Employment Effects of Immigration to Germany: An Analysis Based on Local Labor Markets", The Review of Economics and Statistics, Nov. 1997; pp. 594-604

"Searching for work that pays: State Findings Idaho", accessed from http://idahocan.org/about/pubs/1999.0101_Searching.For.Work.that.Pays.pdf, Jan. 1999; pp. 23-26 and 39-50.

"Seaside Realty—Vacation Rental/Real Estate—Outer Banks, North Carolina", SeasideRealty.com/book/query.html, dated Mar. 3, 2000, accessed Jan. 29, 2011, via Archive.org; 3 pages.

\* cited by examiner

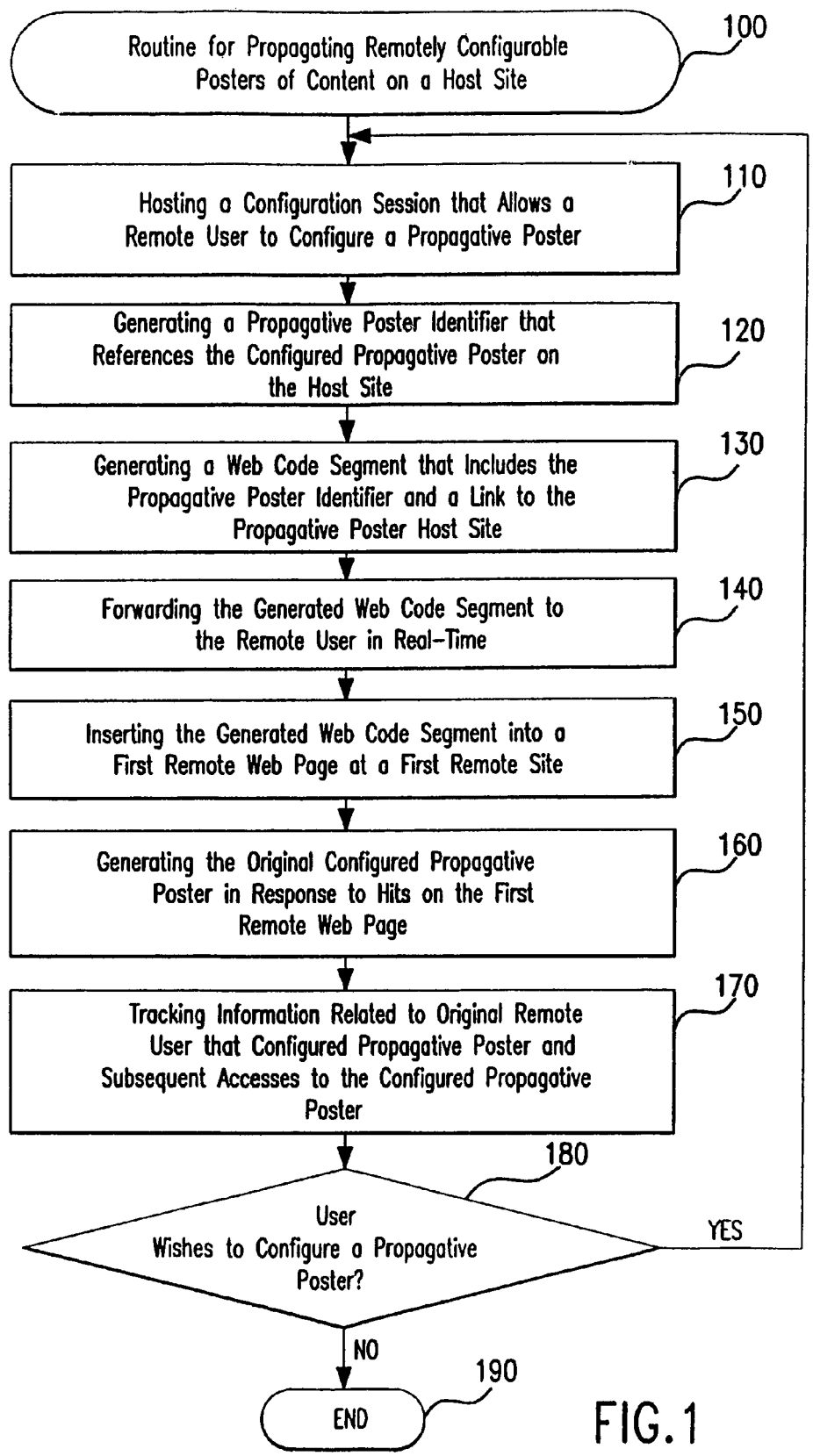

The HTML Code:

```
<A HREF="http://sandbox.icplanet.com/test/pvg/maps/0009.map">
 <IMG SRC="http://sandbox.icplanet.com/test/pvg/imgs/chart1.gif" border="0" ISMAP>
</A>
```

Select the blue text from the box above and copy it into your computer's clipboard. You do this by selecting the text with your mouse, going to the EDIT menu at the top of your browser window, and selecting the COPY option within the menu.

Inserting The HTML Code:

It is important that you paste blue and red code from above between the body tags of your web page.

Open your HTML Document in a text or HTML editor. Scroll through the HTML source and locate the body tag, <body ...>, near the top of the web page. Remember this position because you will want to insert your code below this point. Find the </body> in the last two lines of your web page. You will want to insert your code above this point.

Select an area between the two <body ...> and </body> tags and paste the lines from your computer's clipboard. To do this:

1. Position the cursor in your HTML document at the point where you want to insert the Search Form
2. Go to the EDIT menu at the top of your text edit window
3. Select the PASTE option within the menu.

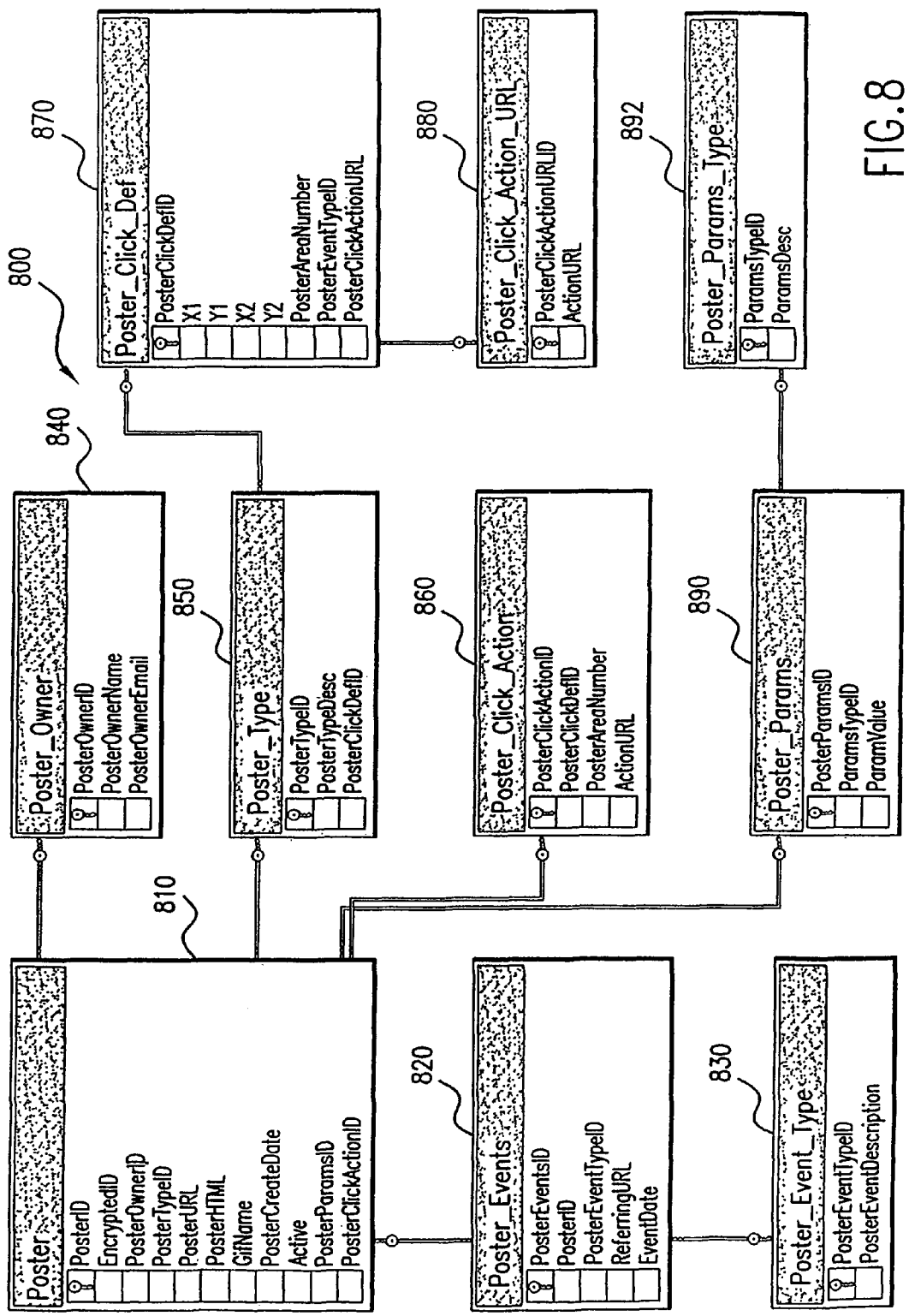

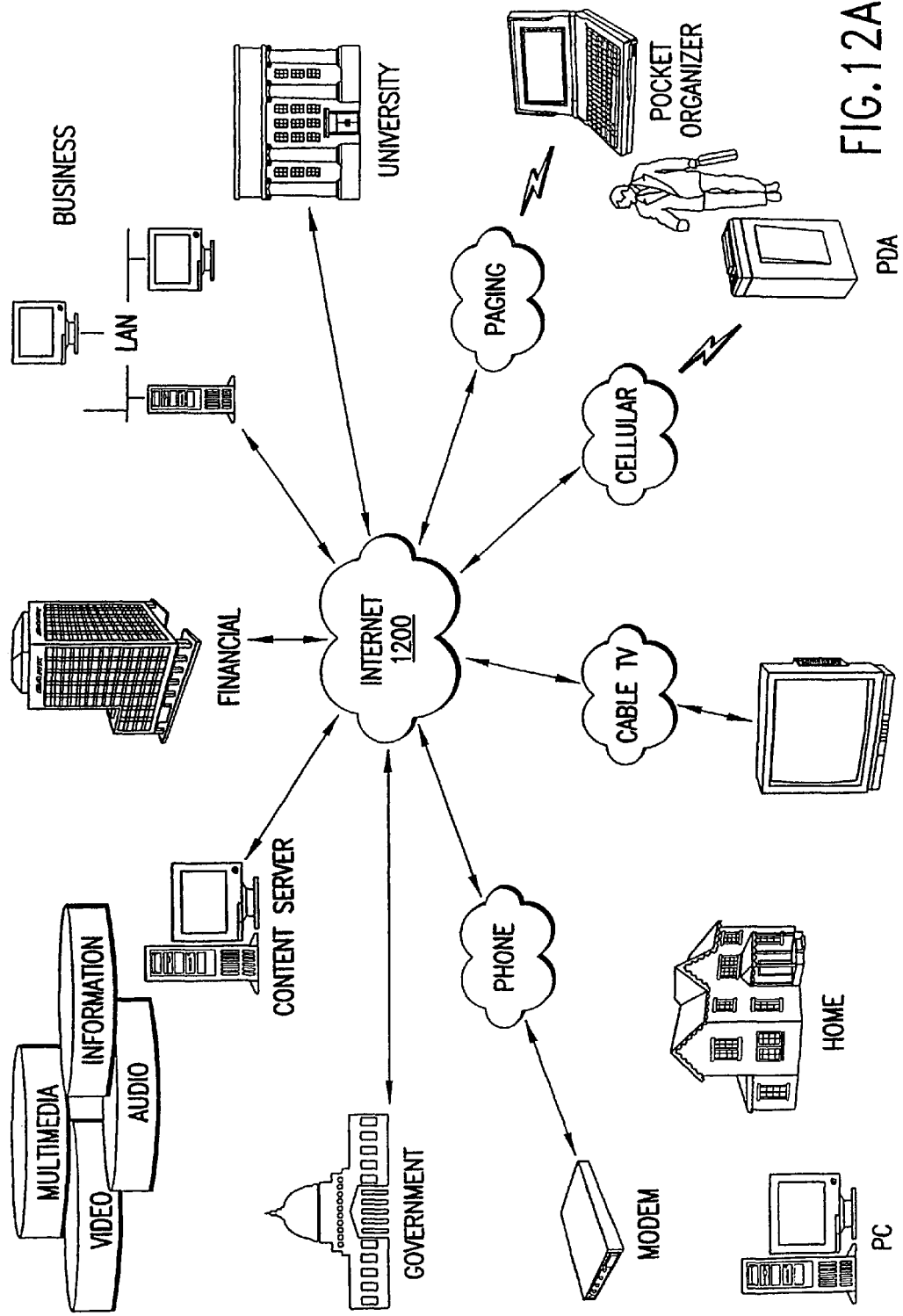

FIG. 13

PRIOR ART

Get: HTML for the Active Logo

Active Logo with Text

This example is simply the short logo and a line of text underneath. Both are links to Northern Light's main search page. They are placed in a table to make the two elements a single discrete element that can be placed on your page.

Example:

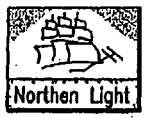

Nothern Light Search

HTML code:

Get: HTML for the Active Logo with Text

Northern Light Search Bar

Search Northern Light's entire database of Web and Special Collection Information.

Example:

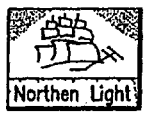

HTML code:

Get: HTML for the Standard Search Bar

Power Search Pulldown Search Bar

A search bar with the option to search within one of Northern Light's Power Search subjects.

Example:

Power Search   All subjects

HTML code:

Get: HTML for the Power Search Pulldown Bar

FIG. 14B

PRIOR ART

```
<!--
┌─ ─ ─ ─ ─ ─ ─ ─ ─ ─ ATTENTION ─ ─ ─ ─ ─ ─ ─ ─ ─ ─ ─┐
│ To add this search bar to your web page copy the HTML below and paste it into any web │
│ page. This search bar is subject to the conditions of Northern Light's Terms of Service │
│ available at http://www.northernlight.com/docs/gen_help_tos.html                        │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
-->

<!-- CUT BELOW THIS LINE to add Northern Light's Search Bar -->

<table border=0>
<tr><td valign=top>
<a href="http://www.northernlight.com/"><img src="http://www.northernlight.com/doc...>
</td>
<td><img border=0 src="http://www.northernlight.com/docs/gif/transparent.gif" widt...></td>
<td>
<table border=0 cellspacing=0 cellpadding=0>
<form action="http://www.northernlight.com/nlquery.fcg" method=get><input type=hid...>
<tr>
        <td valign=top rowspan=4 nowrap align=right><img src="http://www.n..."></td>
        <td align="LEFT" valign="TOP"><img src="http://www.northernlight.com/..."></td>
<font face="Arial, Helvetica" size="-1" color="#0000ff">Search for:</font></td>
</tr>

<tr>
        <td valign=middle><input type=text size=30 name="qr" maxsize=100 v...><td>
<td> </td>
<td><input name=sb type=image src="http://www.northernlight.com/docs/gif/btn_searc..."></td>
 <td><font size=1 face=arial,helvetica><a href="http://www.northernlight.com/docs/..."></td>
</tr><tr>
 <td align=left><SELECT NAME=orl TITLE=source>
<OPTION>ALL Sources</OPTION>

<OPTION VALUE=2:1>World Wide Web</OPTION>
<OPTION VALUE="2:-1">Special Collection</OPTION>
<OPTION value="">------------</option>
<OPTION VALUE=2:12818>Investext Reports</OPTION>
<OPTION VALUE=2:1648>WSJ Abstracts</OPTION>
<OPTION VALUE=2:6123>Business Week</OPTION>
<OPTION VALUE=2:439>Fortune</OPTION>
<OPTION VALUE=2:9>Newspapers, Wires & Transcripts</OPTION>
<OPTION VALUE=2:18519>College newspapers</OPTION>
<OPTION VALUE=2:18508>Broadcast News Transcripts</OPTION>
</SELECT></td>
</form>
</tr>
</form>
</table>
</td></tr></table>

<!-- END OF SEARCH BAR -->
```

FIG. 14C

PRIOR ART

METHOD, SYSTEM, AND COMPUTER PROGRAM PRODUCT FOR PROPAGATING REMOTELY CONFIGURABLE POSTERS OF HOST SITE CONTENT

CROSS-REFERENCE TO RELATED APPLICATIONS

This application is a continuation of U.S. application Ser. No. 09/551,746, filed Apr. 18, 2000, now abandoned which is incorporated herein in its entirety by reference.

BACKGROUND OF THE INVENTION

1. Field of the Invention

The present invention relates to computer networking and communication, including Web-based communications and commerce.

2. Related Art

The World Wide Web is increasingly becoming the Internet technology relied upon for conducting electronic commerce and communication. The World Wide Web, also called the Web or WWW, has three basic parts: client software, servers and content. Client software runs on a user's computer and, among other things, provides the graphical user-interface through which a user can "browse" or "surf" the Web. Servers (also called Web servers) are computers that provide the content to users through a communication link. Content can be any kind of multi-media, e.g., images, text, animation, motion video, sound, and Java applets.

Communication between a browser and a server is carried out through Hyper Text Transfer Protocol (HTTP), Hyper Text Transfer Protocol-Secure (HTTPS) or other Web-compatible protocol. Web content is primarily transferred in Web documents or files, called Web pages, which are addressed by a Uniform Resource Locator (URL). Web pages are often multi-media hypertext documents written in a HyperText Markup Language (HTML) which supports hyper-linking. Data entry in Web pages allows users to make selections and fill-out template or profiles to facilitate user input. For example, scripts are often run on servers through a Common Gateway Interface (CGI) to implement data entry. Programming languages, such as Java, and plug-ins such as Flash, are also being extended to support data entry on the Web.

These parts are well-suited for electronic communication and commerce between remote users. Indeed, the popularity and use of the World Wide Web has increased dramatically. The number of Web sites and Web pages continues to grow. Accordingly, it has become increasingly important to many Web businesses and services to draw traffic to their site. Advertising revenue, registration fees and other sources of revenue generally increase as the number of hits to a site rises. It is also important for many Web businesses and services that access to the local content on their site be distributed widely. Accordingly, it is important to distribute knowledge about the content of a Web site.

Hyperlinking between Web pages is one way a Web site increases traffic to its site. Hyperlinking alone, however, has disadvantages. For example, consider the case where a remote user with a remote Web page adds a hyperlink to another site, such as, a Web site that provides sports information. The remote user inserts a URL for the sports Web site into his or her Web page (e.g., an HTML document). The URL itself, however, does not provide any significant contextual information or actual information about the content of the sports Web site. A user may provide text to describe the sports Web site, but this information can be soon out of date and may not reflect actual information on the Web site.

Some Web services, such as search engines, attempt to increase traffic to their sites by making available HTML code for logos or search bars to be inserted in Web pages on other sites. FIG. 13 shows an example screen served up at the GoogleSM search engine Web site to facilitate linking. In this case, a user is provided with an HTML code segment (called a snippet) and an image that shows how the snippet will appear on the user's Web page. The user is then expected to cut and paste the HTML code segment into their own Web page. FIGS. 14A to 14C show similar examples displayed at the Northern Light search engine. A user is provided with a variety of options (logos and search bars) and corresponding HTML code segments from which to select.

In both of these examples, the HTML code segments are predetermined. No real-time configuration or modification can be made by the user prior to cutting and pasting the HTML code snippet. Any configuration of the HTML code segments must be done by the user. In addition, the servers generating the HTML code segments do not facilitate or support real-time configuration based on user selections or preferences. This increases the burden on the user. Users who do not know HTML or how to configure or modify the HTML code snippet are unable to tailor the link as they desire.

What is needed is an invention which remotely and easily propagates access to Web content. Users need to be able to remotely and easily configure in real-time a link to another Web site.

SUMMARY OF THE INVENTION

A method, system, and computer program product for propagating access to host site content to remote users over the World Wide Web are provided. Access to host site content is distributed more widely and easily through propagative posters. Remote users can access a host site and configure propagative posters in real-time. A Web code segment corresponding to a configured propagative poster is then generated and sent to the remote user in real-time. A remote user can easily cut and paste the generated Web code segment into the user's remote Web page. Alternatively, the generated Web code segment can be automatically inserted into the user's remote Web page if access rights to write on the Web page are available. According to the present invention, propagative posters also permit users to click on (i.e., select) displayed summary information to access further information about a selected item or topic.

In one embodiment, a Web code segment is generated that includes a propagative poster identifier and a link to the host site. The propagative poster identifier allows each poster to be identified. For example, the propagative poster identifier can be a unique poster number. In one embodiment, to enhance security and facilitate URL tracking, a respective private key and a unique poster number are sent through a hash function to obtain a secure fingerprint. The propagative poster identifier is then a combination of the secure fingerprint, the unique poster number and the URL of the remote user that created the poster.

In one embodiment, a propagative poster manager is provided for managing propagative posters of host site content to remote users over the World Wide Web. The propagative poster manager includes a propagative poster configuration module and a propagative poster generator. The propagative poster configuration module hosts a configuration session that allows a remote user to configure a propagative poster of host site content based on at least one configuration selection input by the remote user. The propagative poster generator generates and forwards the propagative poster identifier and the Web code segment to the remote user in real-time.

In one embodiment, configuration is made easy for a user by presenting a series of configuration screens to guide user input. For example, the propagative poster configuration module serves data that enables a first configuration screen to be displayed that includes images of different types of sample posters that can be configured by a user. The propagative poster configuration module then receives a selection by a remote user that identifies one selected type of sample poster and serves data that enables a second configuration screen to be displayed. The second configuration screen has a template for the remote user to configure the selected type of sample poster. The propagative poster configuration module then receives inputs entered in the template. The inputs represent configuration selection inputs made by the remote user. The propagative poster configuration module serves data that enables a third configuration screen to be displayed that includes the first remote user-configured propagative poster. In this way, the remote user can verify in real-time that the user-configured propagative poster is acceptable. After verification, a fourth configuration screen is served that includes the Web code segment to be copied. In one example, the Web code segment is a HTML code segment that enables a browser to access the remote user-configured propagative poster for display.

According to a further feature of the invention, a propagative poster, initially configured by a first remote user, is easily used by subsequent remote users. The propagative poster generator generates the original remote user-configured propagative poster in response to a hit on the first remote user Web page by a subsequent remote user that selects at least a portion of the Web page of the first remote user that corresponds to the generated Web code segment. For example, if the first remote user configured a button or link to access the poster, then a button or link is added in the generated Web code segment. When the second remote user selects the button or link in the Web page of the first remote user, the browser of the second remote user is transferred to the host site. The propagative poster generator then receives the propagative poster identifier and generates data from the host site that corresponds directly to the data presented in the original propagative poster.

According to a further feature, a propagative poster further includes an input portion, such as, a "Make Propagative Poster Now" button. The input portion enables a remote user to make another propagative poster. Another configuration session to create a new poster is then easily initiated by a user by selecting the input portion. For example, the propagative poster configuration module further hosts a second configuration session that allows a second remote user to configure a second remote user-configured propagative poster of host site content based on at least one configuration selection input by the second remote user. In this way, content on a host site is distributed more quickly to a wider audience as users who visit the web page of the first remote user can select and propagate their own posters.

In one embodiment, a propagative poster is periodically refreshed or updated in that the poster is generated based on code executed on current data in the host site content. In one example, at least one configuration selection input made by the first remote user includes at least one search parameter. The propagative poster generator then generates a propagative poster by first executing a search query of data based on each search parameter to obtain a search result based on current host site content. The propagative poster is then generated which includes the current search result. This executing of the code can occur in real-time at the time any remote user accesses the poster or off-line such as during a periodic maintenance run.

In one example implementation, a propagative poster can be any type of window or image including, but not limited to, a window listing job postings, a window listing resume information, a button or go to link to the host site, a search box to search the host site, or a window displaying data related to content on the host site, such as, statistical information, data reports, etc.

According to a further feature, the propagative poster manager includes a propagative poster tracker. The propagative poster tracker tracks URL addresses of remote users accessing the first remote user-configured propagative poster.

According to a further feature, the propagative poster manager includes a propagative poster maintenance module. The propagative poster maintenance module generates reports based on propagative poster records and data tracked by the propagative poster tracker.

A further feature is the ability to track which posters are not being viewed and to discontinue the off-line generation of the posters until a remote user attempts to view it again, thereby causing it to be automatically generated as well as putting it back in the automatic generation queue. This feature enables reduction of the overhead of offline generation without disrupting service.

In one example implementation, a storage device is coupled between a server and a Web server. The server includes a propagative poster configuration module, a propagative poster generator, a propagative poster tracker, and a propagative poster maintenance module. The storage device stores at least the following fields of information related to respective generated user-configured propagative posters: a propagative poster identifier, a bit map, a non-executable Web code segment, and an executable code. A database is also coupled between the server and the Web server. The database stores propagative poster records that include user profile and tracking information related to respective generated user-configured propagative posters.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 1 is a flowchart of a routine for propagating remotely configurable posters according to one embodiment of the present invention.

FIG. 2D shows a screen with HTML text for propagating a poster according to one embodiment of the present invention.

FIG. 8 is a diagram of a set of records for managing propagative posters according to one embodiment of the present invention.

FIG. 12A is a diagram of an example internet work environment according to the present invention.

Figure 13:
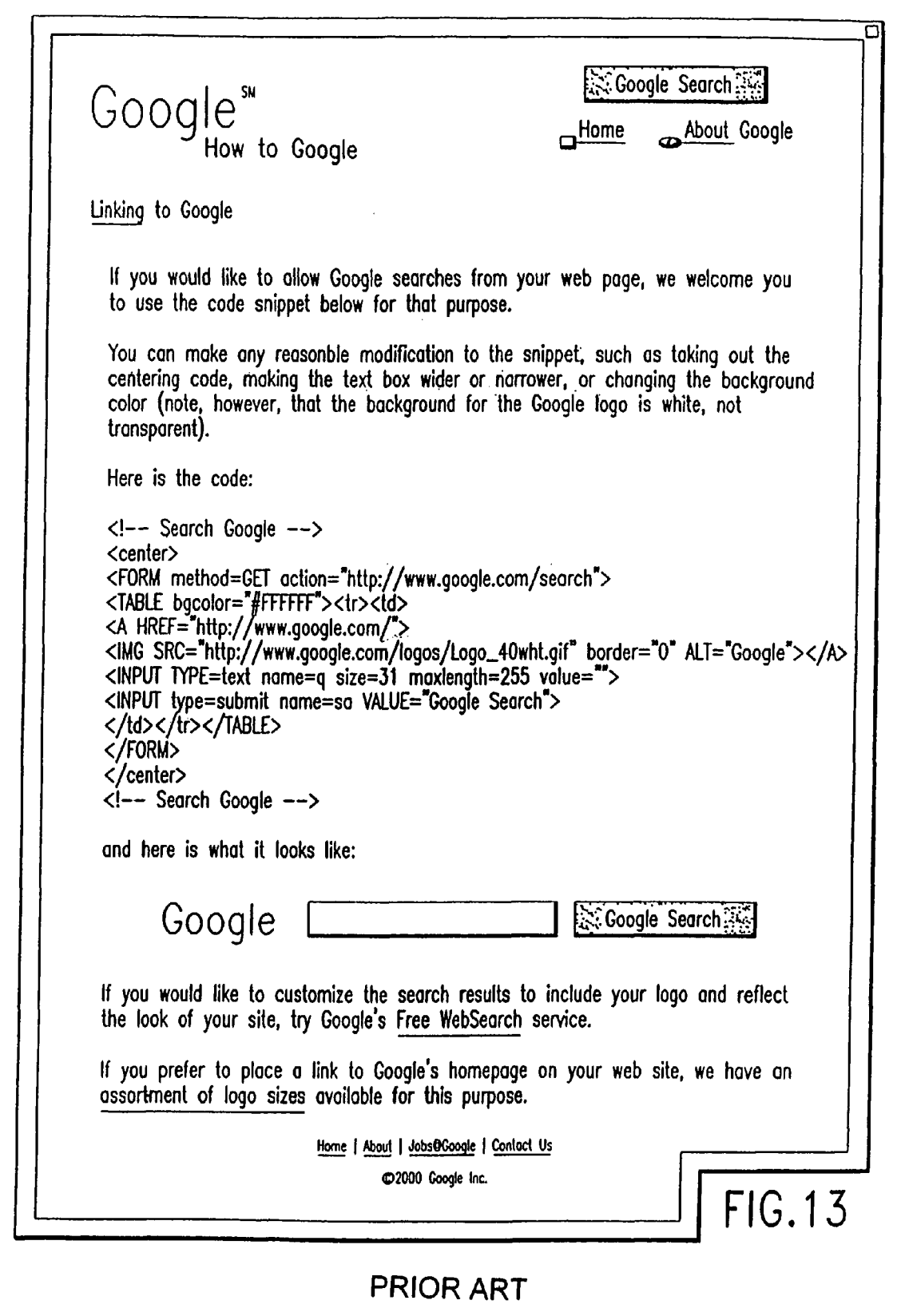

FIG. 13 shows an example screen displayed at the GoogleSM search engine Web site to facilitate non-configurable linking.

FIGS. 14A, 14B, and 14C show example screens displayed at the Northern Light search engine to facilitate non-configurable linking.

Figure 2A:
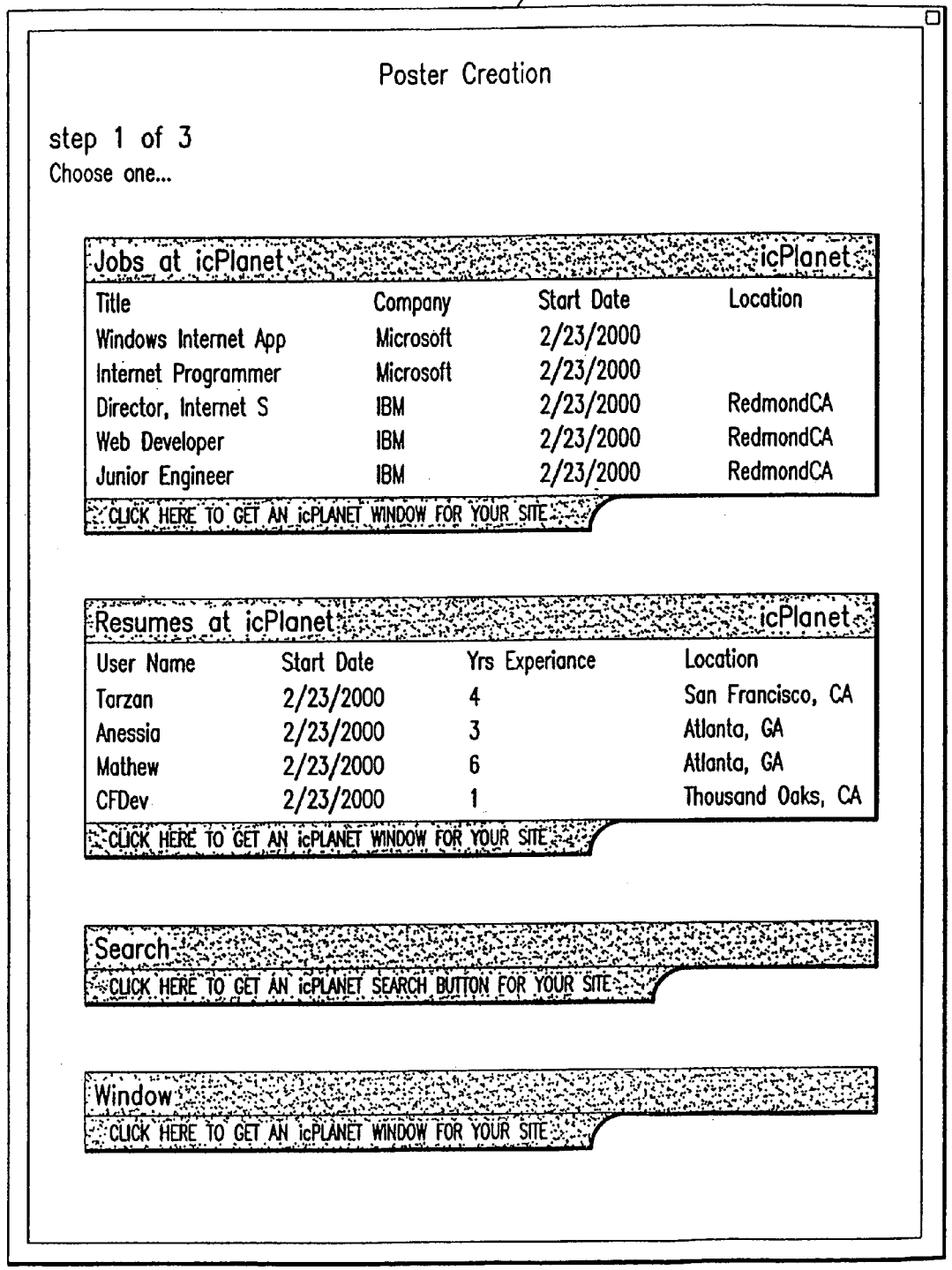
FIGS. 2A, 2B and 2C show configuration screens served during a configuration session according to one embodiment of the present invention.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF EMBODIMENTS

Table of Contents
I. Overview and Terminology
I. Propagating Remotely Configurable Posters
   A. Configuration
   B. Web Code Segment Generation
   C. Tracking
   D. Further Remotely Configurable Poster Propagation
III. Example On-Line Propagative Poster System
   A. Host Site with Propagative Poster Management
   B. Propagative Poster Manager
   C. Operation
   D. Further Propagation
   E. Propagative Poster Maintenance
   F. Example Propagative Poster Record and Tracking Information
   G. Detailed Viewing of Information Concerning Data Summarized on a Propagative Poster
IV. Example Environment
V. Example Computer System
VI. Conclusion
I. Overview and Terminology The present invention provides a method, system, and computer program product for propagating access to host site content to remote users over the World Wide Web (also referred to as WWW or the Web). Access to host site content is distributed more widely and easily through propagative posters. Remote users can access a host site and configure propagative posters in real-time. A Web code segment corresponding to a configured propagative poster is then generated and sent to the remote user in real-time. Propagative posters also permit users to select summary information about an item or topic displayed thereon to access further information about that selected item or topic.

The term "propagative poster" refers to any type of poster created and managed according to the present invention. Such a "poster" can include, but is not limited to, any one or more of an image, bitmap, link, button, window, display view, and/or applet.

The term "real-time" means information, such as a user input and a host site response, that can be exchanged in a round-trip cycle between a remote user and the host site with little or no delay, such as, within seconds or minutes (any delay being essentially a function of the communication medium and devices connected between a user and the host site).

The terms "Web code segment" and "non-executable code segment" refer interchangeably to a segment that can be inserted into a Web page and is capable of being interpreted by a browser. A Web code segment can include, but is not limited to, HTML text.

The present invention is described with respect to propagating posters over the Web. The present invention is not necessarily limited to the Web and can be applied in any interactive, computer networking service, including but not limited to the Web.

II. Propagating Remotely Configurable Posters

The operation of the present invention is described first with respect to a routine 100, as shown in FIG. 1. During the description of routine 100, reference is made to example display screens 210, 220, 230, and 240 shown in FIGS. 2A-2D. Propagative poster management is then further described with respect to an example system and architecture shown in FIGS. 3 and 4. Example data structures used in the propagative poster management system of FIG. 3 are further described with respect to FIGS. 5, 6, 7, and 8. The operation of the propagative poster management system 300 is further described with respect to flowcharts shown in FIGS. 9A and 9B, FIGS. 10A and 10B, and FIG. 11.

FIG. 1 shows a routine 100 for propagating remotely configurable posters of content on a host site (steps 110-190).

A. Configuration

First, a configuration session is hosted that allows a remote user to configure a propagative poster (step 110). The configuration session allows the remote user to configure a propagative poster based on inputs or configuration selections made by the remote user. In one example, the present invention serves data that enables a series of configuration screens to be displayed to the remote user. The configuration screens can include templates or forms to further guide input by the user.

FIGS. 2A-2D show one example series of screens for configuring and propagating a propagative poster. FIG. 2A shows a first configuration screen 210. Configuration screen 210 includes images of different types of sample posters that can be configured by user. In this example, four sample types of posters can be selected by a user. The first type is a window that displays job posting information at a host site. The second type is a window that displays resume information at the host site. The third type is a search button that enables a user to perform a search of data at the host site. The fourth type of poster is a data display window that displays information. For example, a data display representing statistical information about data on the host site can be provided in a propagative poster.

Figure 2B:
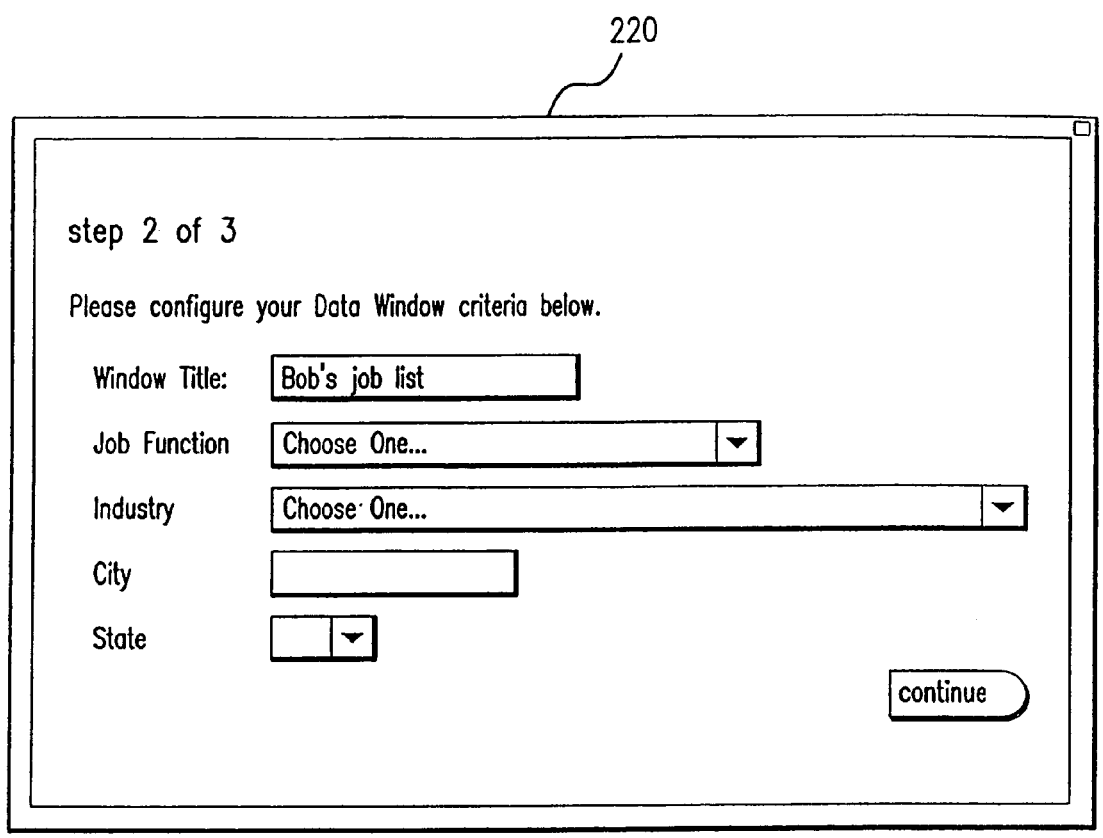
Figure 3:
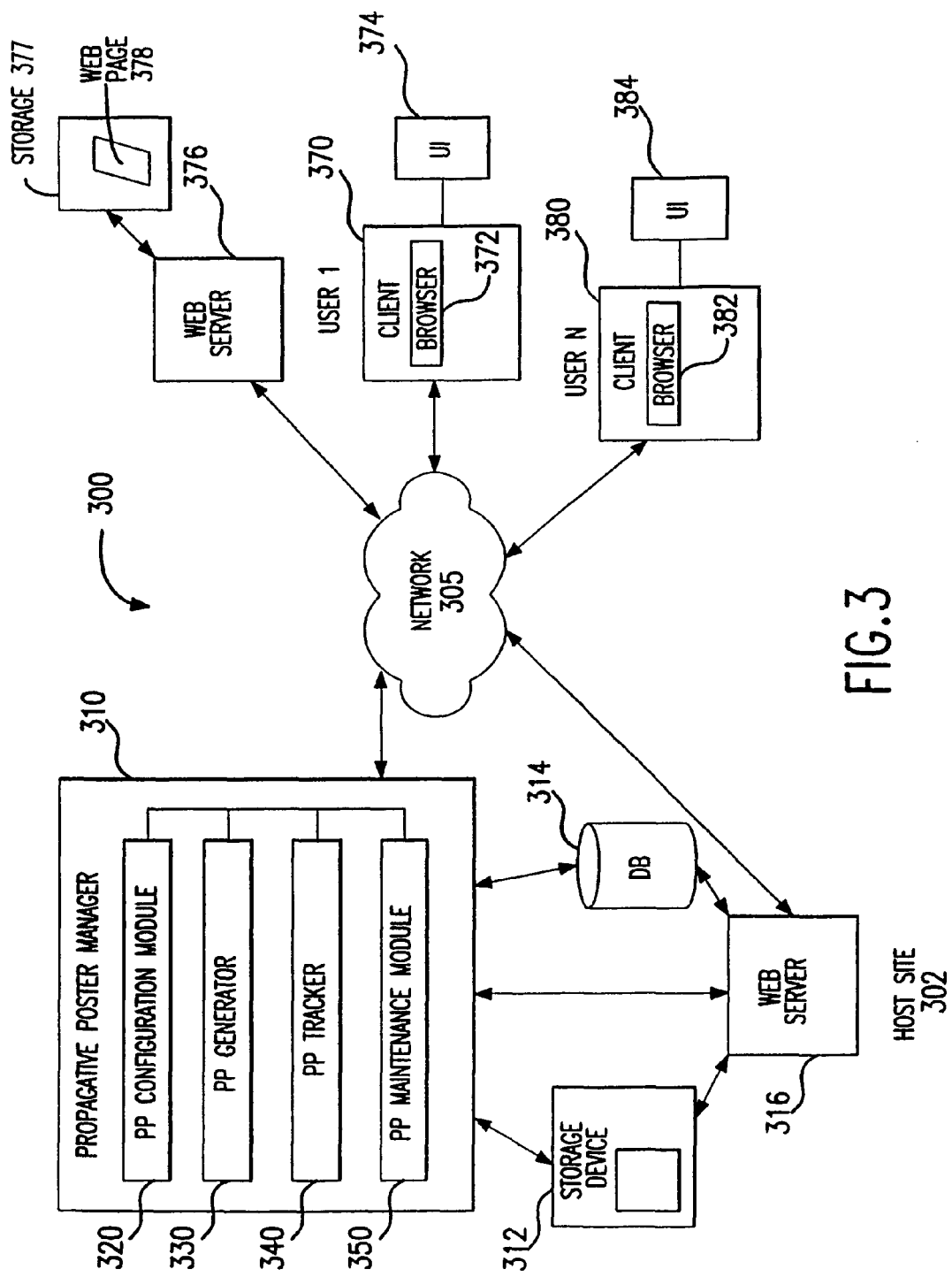
FIGS. 3 and 4 are block diagrams of a system for propagating remotely configurable posters according to one embodiment of the present invention.

A user then selects the desired type of propagative poster from configuration screen 210 and is presented with a second configuration screen 220, as shown in FIG. 2B. Configuration screen 220 allows the user to further configure the content of the propagative poster. For example, if a user selected the job posting type of propagative poster in configuration screen 210, then a configuration screen 220 is served that allows the user to configure user-specified criteria. As shown in FIG. 2B, a template is provided in configuration screen 220 that allows a user to enter a title for the propagative poster, and to select a job function, type of industry, city, and state information. Pop-up windows can be selected to further guide a user to different types of job functions or types of industries which can be input. Similar configuration screens are presented when a user selects a resume type of propagative poster. These configuration screens, however, include templates designed to facilitate user input of fields related to resume information, such as user name, start date, years of experience, and location.

When anything but the search box type of propagative poster is configured, the configuration screens include one or more templates that allow a user to enter desired search parameters. Finally, when a data window is selected as the type of propagative poster to be configured, configuration screens are presented that allow a user to select the type of data display. For example, a template can be displayed that allows a user to select the type of data to be displayed (e.g., job or resume type of information), and the type of display format (e.g., statistical summaries, pie charts, bar charts, graphs, tables, and other formats).

Figure 2C:
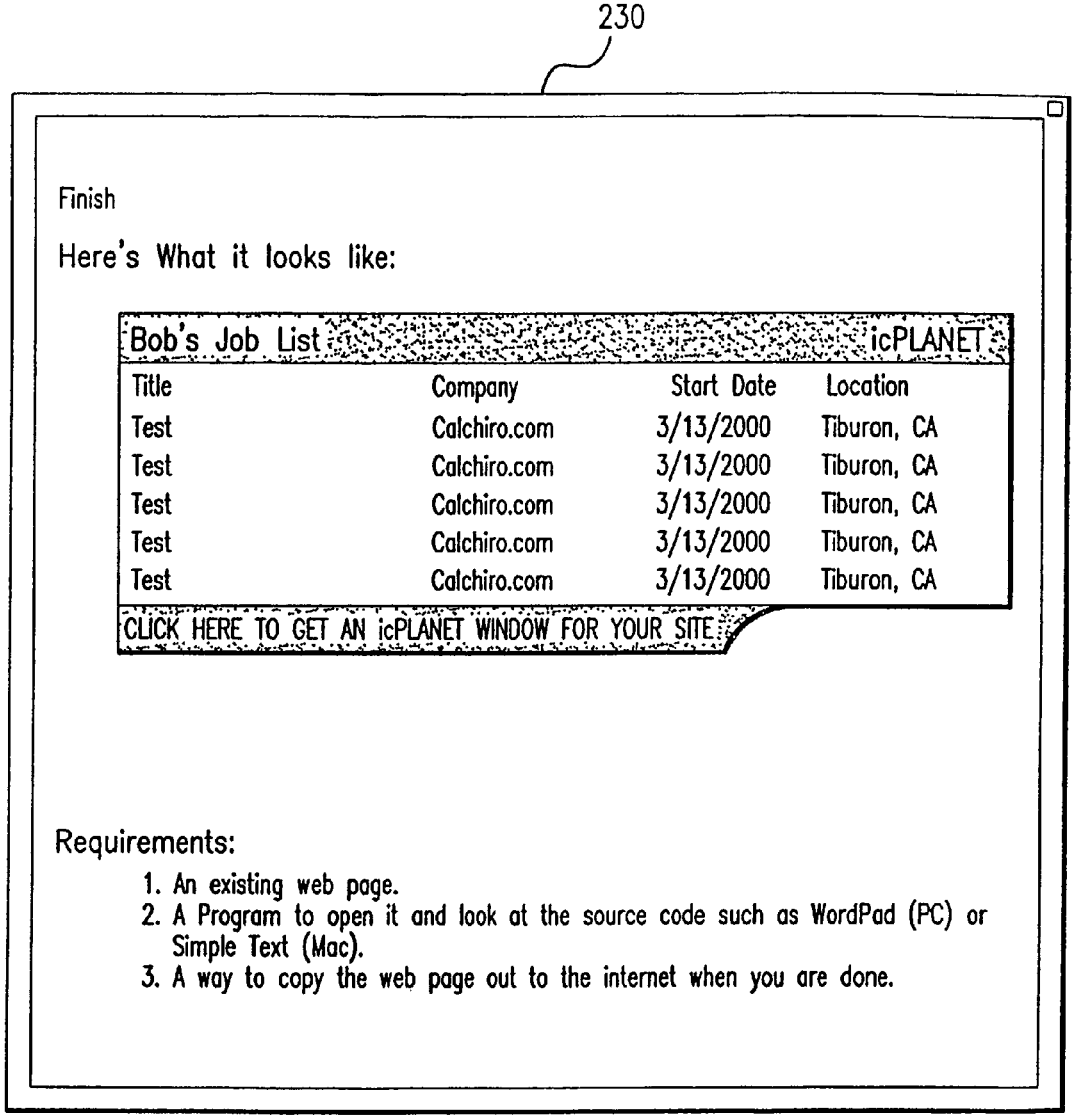

As shown in FIG. 2C, a third configuration screen 230 is then displayed that shows the user configured propagative poster as it would appear on a web page. The remote user can then verify that the configured propagative poster is acceptable. In one example, an OK ("Finish") button or other input device can be used to enable the user to indicate that the poster is acceptable.

B. Web Code Segment Generation

After configuration, a Web code segment is generated. First, a propagative poster identifier is generated (step 120). The propagative poster identifier references the configured propagative poster on the host site. In step 130, a Web code segment is generated that includes at least a propagative poster identifier and a link to the host site. The link can be a URL of the host site through which the propagative poster can be accessed. In step 140, the generated Web code segment is forwarded in real time to the browser of a remote user. The generated Web code segment is then inserted into a remote page at a remote site designated by the user (step 150).

FIG. 2D shows an example screen 240 that illustrates steps 120-150. Example screen 240 includes an example Web code segment generated according to steps 120-130. The Web code segment is HTML text and includes a propagative poster identifier and a link to the host site. The HTML text is sent over an HTTP link for display in the browser of the remote user (step 140). For example, as shown in FIG. 2D the HTML text can be provided in a box within the screen 240 to enable a user to easily select the HTML text. The user can then cut and paste the HTML text into another remote Web page as described with respect to step 150.

Note screen 240 also includes instructions to guide the user to further facilitate easy cutting and pasting of the HTML code segment. Alternatively, the Web code segment can be automatically inserted by the host site into a designated Web page of the remote user. This of course requires that the host site be granted access rights to write on the Web server of the remote user.

The display screens 210 through 240 described with respective FIGS. 2A through 2D are illustrative and not intended to limit the present invention. For example, a smaller or larger number of screens can be used. Different types of information and format can be included in screens 210-240 in accordance with the present invention. Any type of user input entry device can be used, including but not limited to templates, forms or other data entry modes.

After step 150, the first or original configured propagative poster is then accessible to subsequent users that visit the remote Web page with the inserted Web code segment. For example, the remote Web page may include a display of the propagative poster itself and/or a button or link to the propagative poster. When a subsequent user visits or "hits" the remote Web page the original configured propagative poster is generated (step 160). Because the inserted Web segment included a link to the propagative poster host site the subsequent user can be hyperlinked to the host site itself through conventional HTTP. The propagative poster identifier drawn from the Web code segment further allows the host site to automatically serve the appropriate propagative poster to the second or subsequent remote user. In particular, an overlay window is generated on the browser of the subsequent remote user that displays the original configured propagative poster.

At this time, the subsequent user is communicating directly with the host site. The host site can generate the original configured propagative poster based on current data at the time the poster is accessed. Alternatively, the host site can display the original configured poster data based on data in the host site at the time the original user configured the poster or at the time when the poster was periodically "refreshed" or updated. For example, the host site may periodically generate and store the configured propagated posters offline as part of a daily maintenance or updating procedure. Regardless, the subsequent user is able to view the poster configured by the original user that includes data on the host site. In this way, host site data is propagated and distributed widely over the WWW.

C. Tracking

The host site can further track information related to the original remote user that configured the propagative poster and subsequent accesses made to the configured propagative poster (step 170). For example URL history information of the original remote user and subsequent remote users that access the propagative posters can be tracked. Click-through information can be tracked. In general, any type of tracking and user profiling can be used depending on what we have access to via the document object model (DOM) and/or other methods. According to one feature of the present invention, the number of accesses made to configured propagative posters and the frequency of the number of accesses made is tracked. In this way more active propagative posters can be refreshed more often.

D. Further Remotely Configurable Poster Propagation

According to a further feature of the present invention a propagative poster further includes an input portion, such as, a "Make Propagative Poster" button. The input portion enables a remote user to easily make another propagative poster. For example, as shown in the configuration screen 230, a propagative poster can include an input portion labeled "click here to get a window for your site" or "make propagative poster now."

In step 180, a check is made to determine whether a user wishes to configure a propagative poster. In particular, a check is made to determine whether the user has made a selection to the input portion for making a propagative poster. When a user does wish to configure a propagative poster, a configuration session to create a new poster is then initiated. Steps 110 through 170 are then repeated for the subsequent remote user. In this way, another propagative poster is easily generated for the subsequent remote user. Content on the host site is then distributed even more quickly to a wider audience as users who visit the Web page of the remote user select and propagate their own posters. When a user doesn't want to configure a propagative poster then routine 100 ends (step 190).

III. Example On-Line Propagative Poster System

Figure 4:
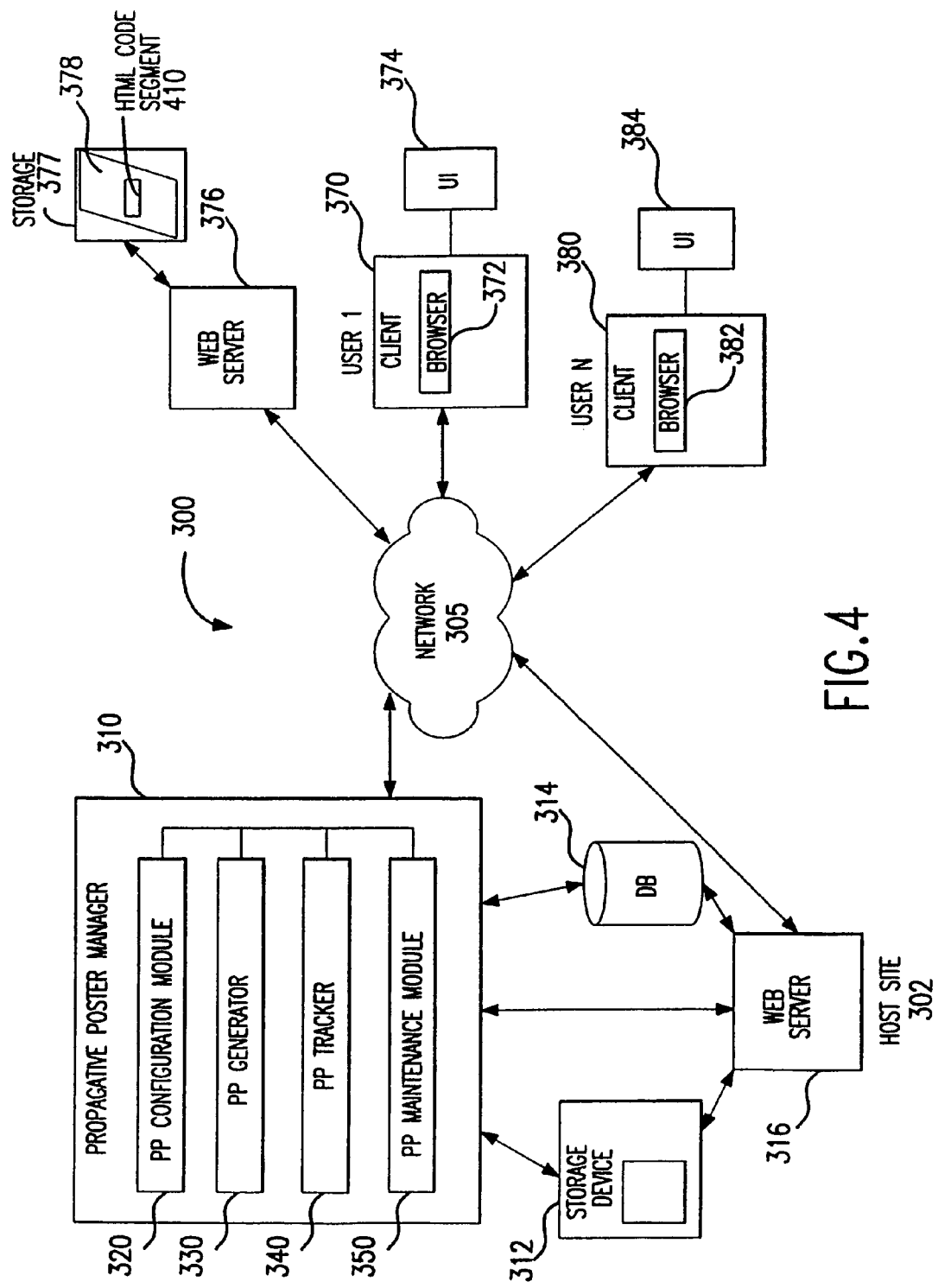

FIGS. 3 and 4 are block diagrams of an on-line system 300 for propagating remotely configurable posters according to one embodiment of the present invention. Propagative poster system 300 includes a host site 302. Host site 302 is coupled through communication links over network 305 to any number of clients of remote users. For clarity, only client 370 of user 1 and client 380 of user n are shown. Client 370 includes a browser 372 and a user interface 347. Similarly, client 380 includes a browser 382 and a user interface 384. A remote Web server 376 is also coupled to network 305. Web server 376 is further coupled to a storage device 377 storing Web page 378. FIG. 4 shows how an example HTML segment 410 generated according to the present invention is inserted into a remote Web page 378.

A. Host Site with Propagative Poster Management

Host site 302 includes a propagative poster manager 310, storage device 312, database 314, and Web server 316. Propagative poster manager 310 and Web server 316 are coupled to one another and to storage device 312 and database 314. Storage device 312 stores records related to the content of propagative posters and the management of propagative posters. Database 314 stores data for host site 302, that is, the local content of host site 302. Propagative poster manager 310 further includes a propagative poster configuration module 320, propagative poster generator 330, propagative poster tracker 340, and propagative poster maintenance module 350.

Host site 302 can be implemented on any one or more processors. In one example, not intended to limit the present invention, propagative poster manager 310 is implemented on one or more servers. Likewise, Web server 316 can be one or more Web servers supporting Web services. Storage device 312 can be a type of data storage device or combination of data storage devices including, but not limited to, a type of memory and/or database. Database 314 can be any type of database (relational or non-relational). Additional databases can be added to accommodate greater capacity. In one example, host site 302 is a Web site that supports on-line employment services, especially for independent consultants and hiring managers who are looking to hire independent consultants. These on-line employment services can include but are not limited to presenting and managing job postings, resume collection, formatting and storage, spidering, and e-mail campaign generation and management. Other servers and modules (not shown) can support these services and provide data for database 314.

B. Propagative Poster Manager

Propagative poster manager 310 further includes a propagative poster configuration module 320, propagative poster generator 330, propagative poster tracker 340, and propagative poster maintenance module 350. Propagative poster configuration module 320 hosts configuration sessions that allow remote users to configure propagative posters of host site content. Propagative poster generator 330 generates propagative poster identifiers and corresponding Web code segments as described above with respect to Steps 110-130. Propagative poster tracker 340 tracks URL addresses of remote servers accessing the user configured propagated posters and other profiling and tracking information. Propagative poster maintenance module 350 generates reports based on propagative poster records and data tracked by the propagative poster tracker 340. Propagative poster manager 310 (including each component of propagative poster configuration module 320, propagative poster generator 330, propagative poster tracker 340, and propagative poster maintenance module 350) can be control logic implemented in software, firmware, hardware or any combination thereof. The operation of the on-line propagative poster system 300 and in particular propagative poster manager 310 is described further with respect to the example data structures in FIGS. 5 to 8 and the operational flowchart of FIGS. 9A, 9B, 10A, 10B, and 11.

C. Operation

Figure 9A:
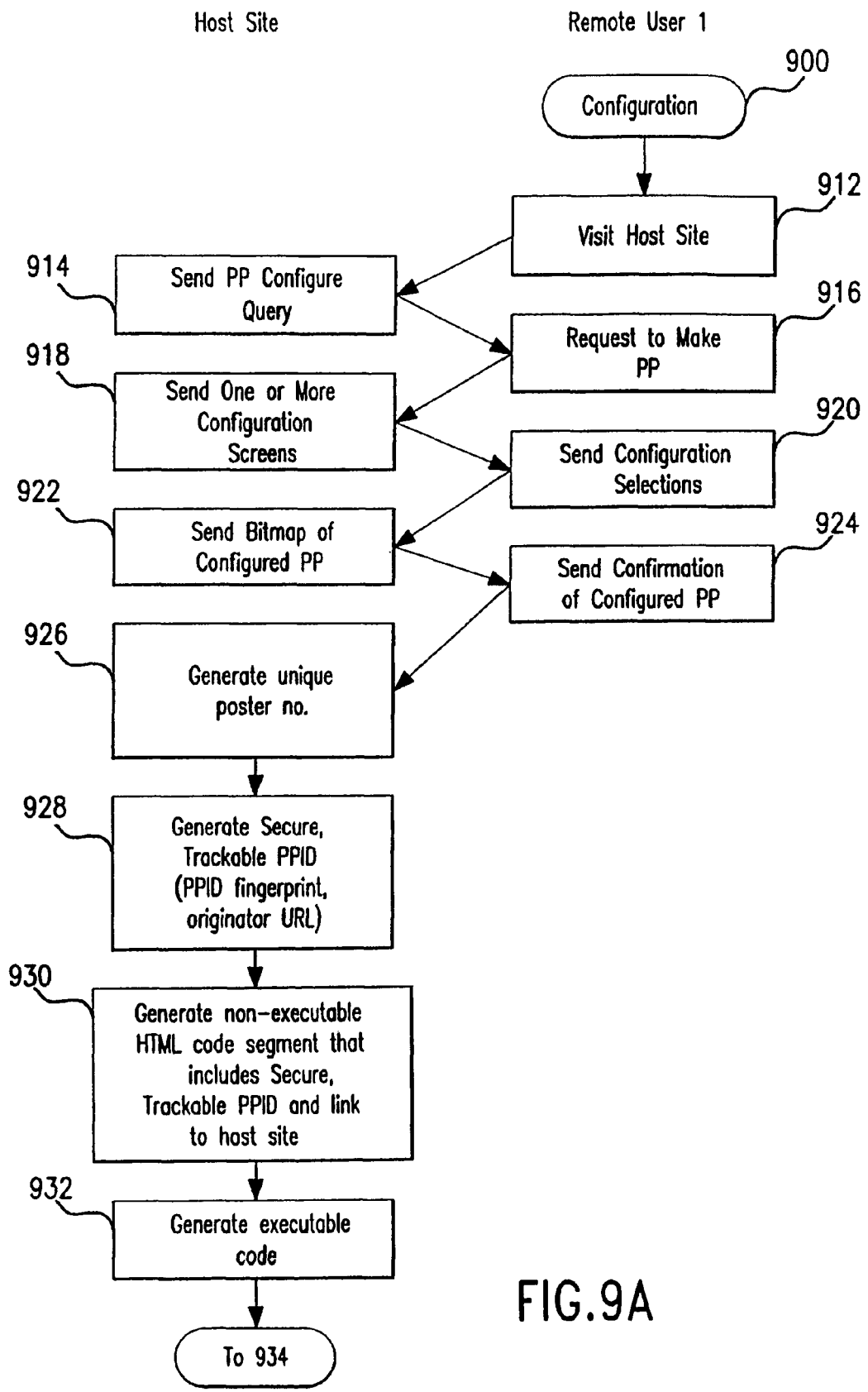
FIGS. 9A and 9B are flowcharts of a routine for propagating remotely configurable posters according to one embodiment of the present invention.
Figure 9B:
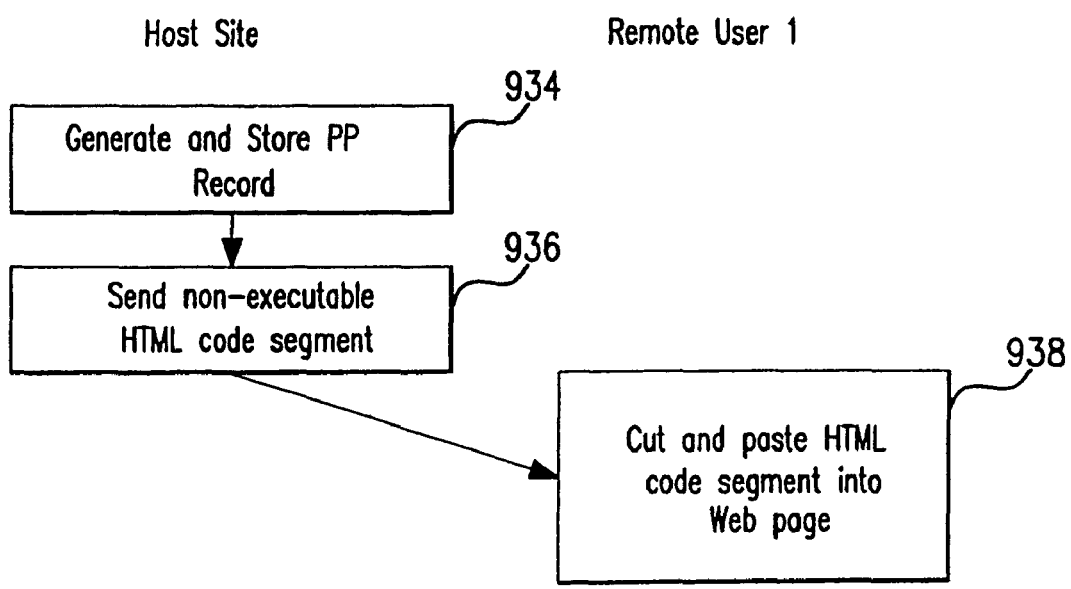

As shown in FIG. 9A, a first configuration session 900 begins when a remote user 1 visits host site 302 (step 912). User 1 enters the URL of host site 302 (in particular, the URL of Web server 316) into browser 372. User 1 is then linked to Web server 316. Host site 302 then through Web server 316 presents different web pages to browser 372 for reviewing by user 1. These web pages can include any type of host site content. In step 914, a propagative poster query is sent. This query for example can be an input portion on a window that indicates "make propagative poster now." Alternatively, a separate window asking the remote user if they wish to configure a propagative poster can be displayed.

In step 916, user 1 requests to make a propagative poster. Host site 302 receives the request and sends one or more configuration screens (step 918). In particular, propagative poster configuration module 320 sends one or more configuration screens 210-230 in a configuration session as described above with respect to step 110 and FIGS. 2A to 2C. User 1 inputs desired configuration selections into the one or more screens. Browser 372 then sends the user's configuration selections to host site 302 (step 920).

Propagative poster manager 310 then generates and sends a bitmap or text of a configured propagative poster to browser 372 (step 922). Browser 372 then sends a confirmation input by user 1 indicating that the configured propagative poster is acceptable (step 924).

Propagative poster generator 330 then generates a propagative poster identifier that includes a unique poster number (step 926). Alternatively, in one embodiment to enhance security and promote tracking propagative poster 330 further includes a hash function generator. Any type of hash function can be used including but not limited to a one-way hash function such as the MD5 message-digest algorithm (B. Schneier, Applied Cryptography, Second Edition (John Wiley & Sons, Inc. United states of America) 1996, pp. 351-354, and R. Rivest, "MD5 Message-Digest Algorithm," Networking Group Request for Comments: 1321 MIT Laboratory for Computer Science and RSA Data Security, Inc., April 1992 (downloaded Mar. 30, 2000)), each of which is incorporated in its entirety herein by reference.

Figure 5:
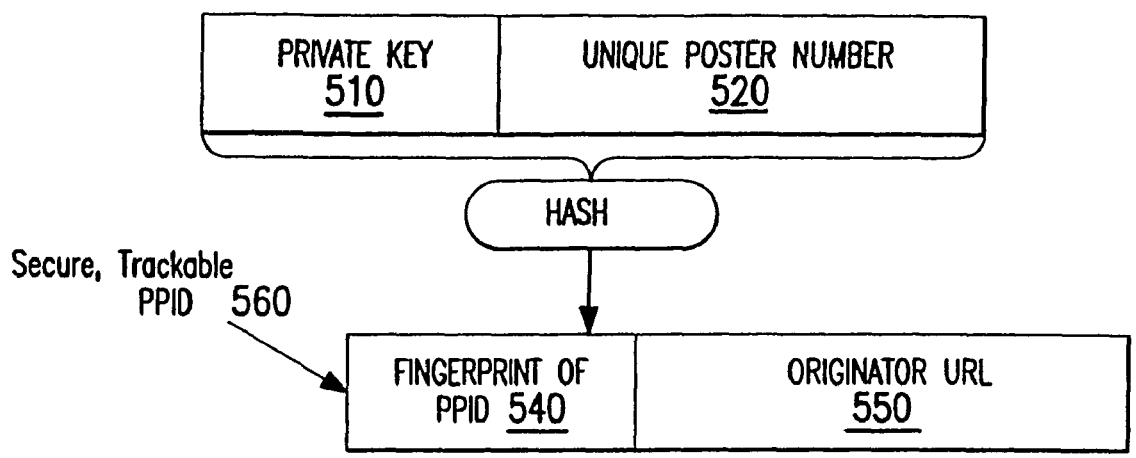
FIG. 5 is a diagram of a propagative poster identifier and a secure, trackable propagative poster identifier according to one embodiment of the present invention.

The hash function generator as shown in FIG. 5 receives a respective private key 510, and unique poster number 520. The hash function generator then outputs a secure fingerprint 540. Propagative poster (PP) generator 330 then concatenates the secure fingerprint 540 and the URL of the first or originating remote user to generate a secure, trackable propagative poster ID (PPID) 560 (step 928).

PP generator 330 then generates a non-executable HTML code segment 410 that includes secure, trackable PPID 560 and a link (URL) to host site 302 (step 930). PP generator 330 further generates executable code. PP generator 330 then generates and stores a PP record 600 in storage device 312 (step 934).

Figure 6:
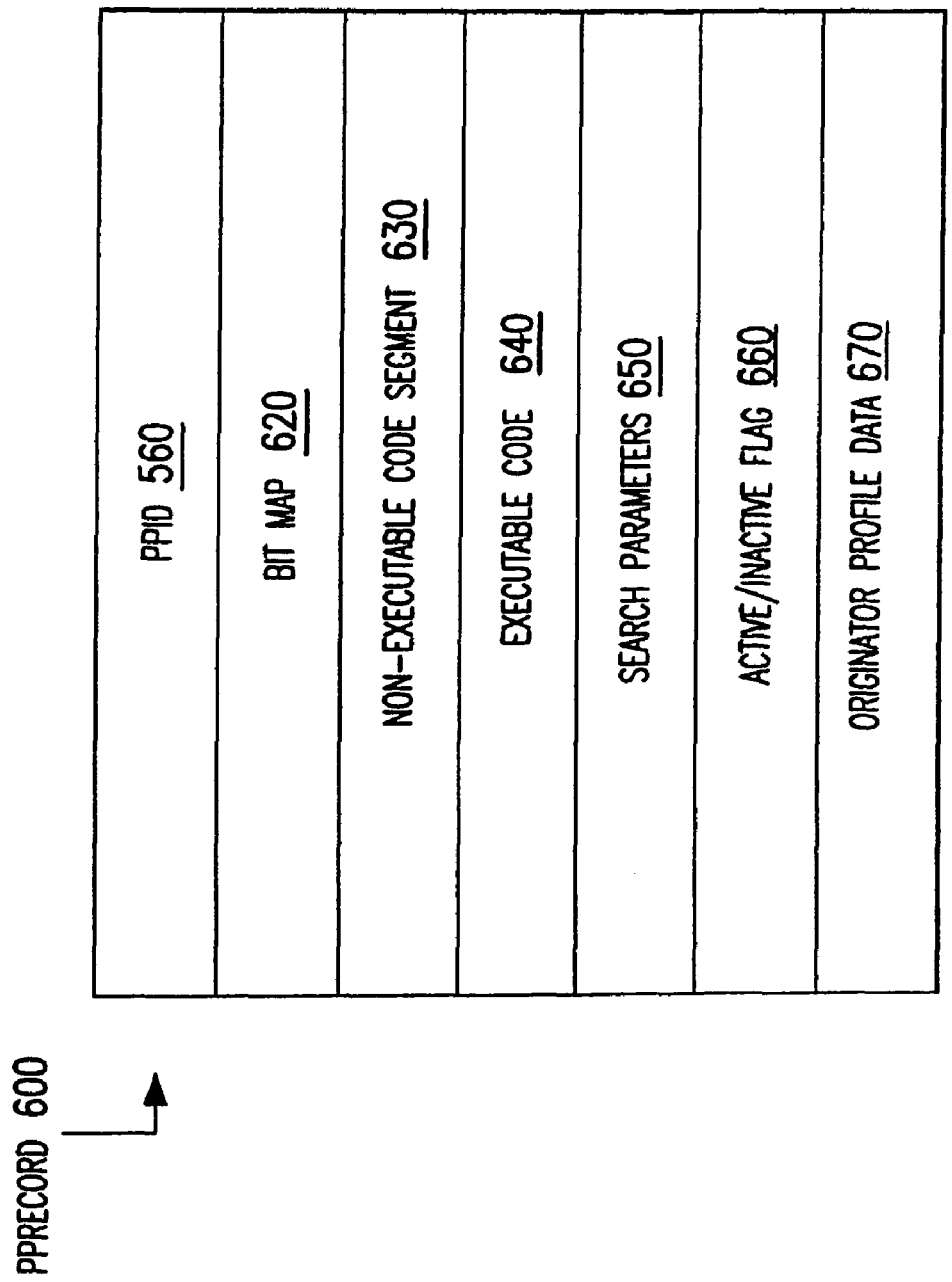
FIG. 6 is a diagram of a propagative poster record according to one embodiment of the present invention.

FIG. 6 shows an example propagative poster record 600 stored in storage device 312. Propagative poster record 600 includes a propagative poster ID 560, bitmap 620, non-executable code segment 630, executable code 640, search parameter 650, active/inactive flag 660, and originator profile data 670. Bitmap 620 is an image of the propagative poster configured by user. Non-executable code segment 630 represents the web code segment (e.g, HTML segment 410) generated in step 930.

Figure 7:
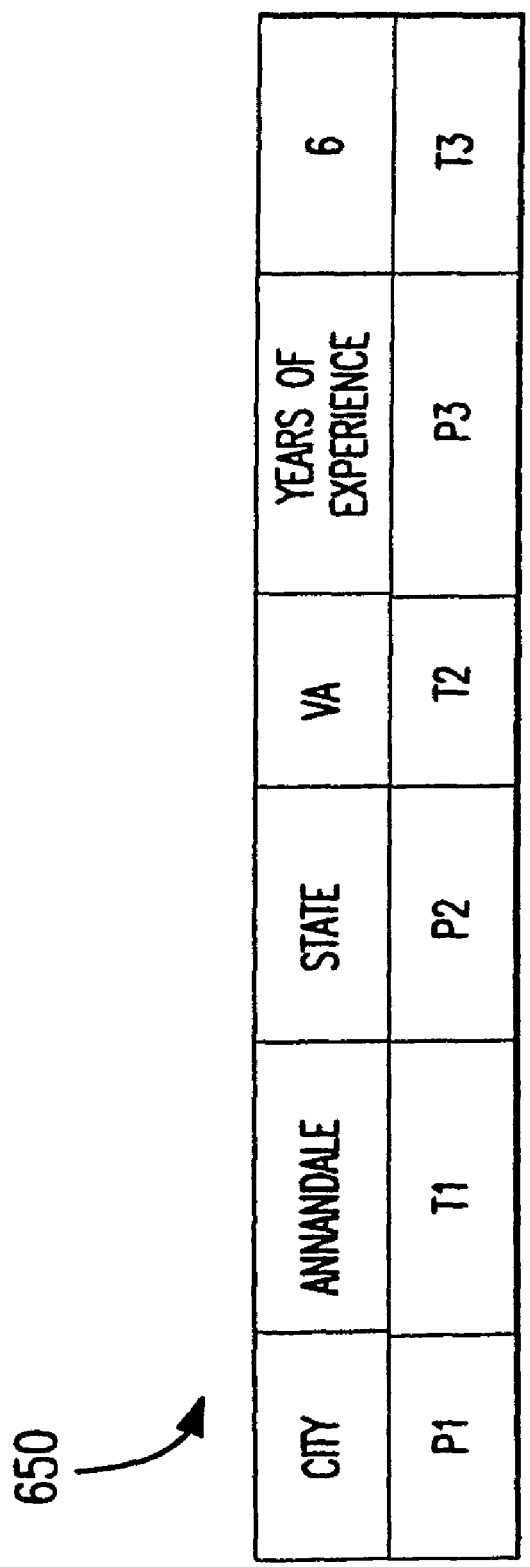
FIG. 7 is a diagram of example search parameters that can be used in the propagative poster record of FIG. 6.

Executable code 640 is executable code that enables host site 302 to generate a propagative poster configured in accordance with the selections of the user based on data in database 314 of host site 302. For example, executable code can include, but is not limited to, Structured Query Language (SQL) or other language that enables a search of database 314 to be performed. Search parameter 650 are keywords, Boolean operators, other operators that identify a particular search selected or configured by the user during the configuration of the respective propagative poster. In one example, search parameters can include poster title, job function, zip code and state. FIG. 7 shows an example of search parameters input to obtain a desired resume information type of propagative poster. For example, search parameter 650 as shown in FIG. 7 includes field type (P1, P2, P3) and field value (T1, T2, T3) information. Field type P1 corresponds to city information with a value of "Annandale" T1. Field type P2 corresponds to state information with a value of "VA" T2. Field type information P3 corresponds to years of experience with a value "6" T3. In this way, executable code 640 can be executed by host site 302 to search database 314 based on search parameter 650 to generate and refresh propagative poster content.

This example is illustrative only and not intended to limit the present invention. Any number and type of data fields and values can be used as would be apparent to a person skilled in the art given this description. Also, search parameter 650 may not be used for certain types of posters that do not require a search of host site data.

Active/inactive flag 660 is set by propagative poster maintenance module 350 depending upon how frequently a particular propagative poster is accessed. For example, if propagative poster maintenance module 350 determines that no hits have been made to the propagative poster, then propagative maintenance module 350 sets flag 660 to an inactive value. When a hit is made to the propagative poster, propagative maintenance module 350 initiates immediate generation and then sets the flag to active. Propagative poster manager 310 further stores originator profile data 670. Originator profile data 670 can include profile information entered by the user creating the poster during configuration (or a prior registration session).

Propagative poster manager 310 then sends the non-executable HTML code segment 630 to browser 372 at client 370 (step 936). User 1 through browser 372 then inserts non-executable HTML code segment into a Web page (step 938). As described with respect to step 150, the non-executable HTML code segment can be inserted manually (e.g., cut and pasted) by a user or automatically by host site 302.

D. Further Propagation

Figure 10A:
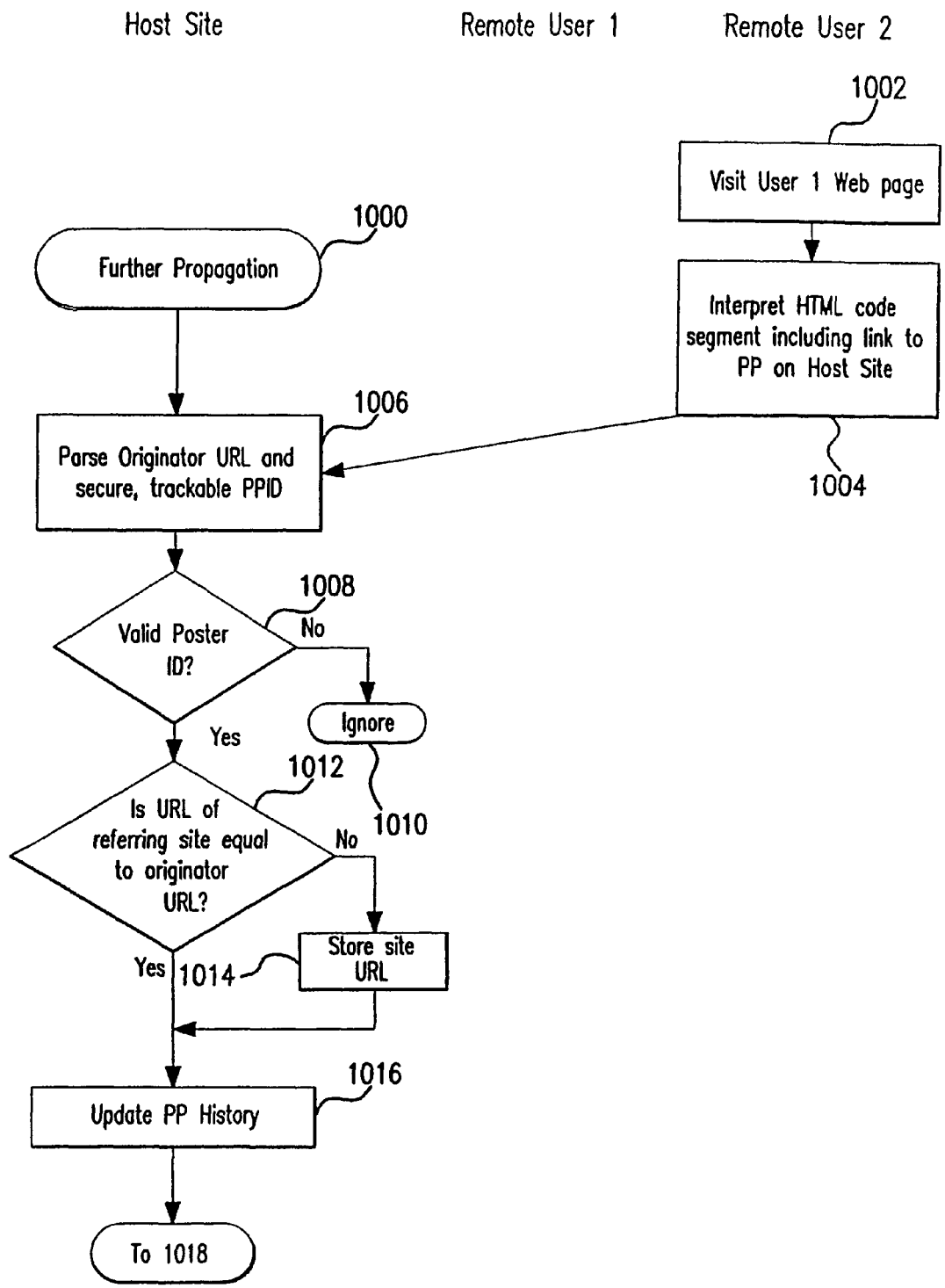
FIGS. 10A and 10B are flowcharts of a routine for further propagating remotely configurable posters including tracking and profiling, according to one embodiment of the present invention.
Figure 10B:
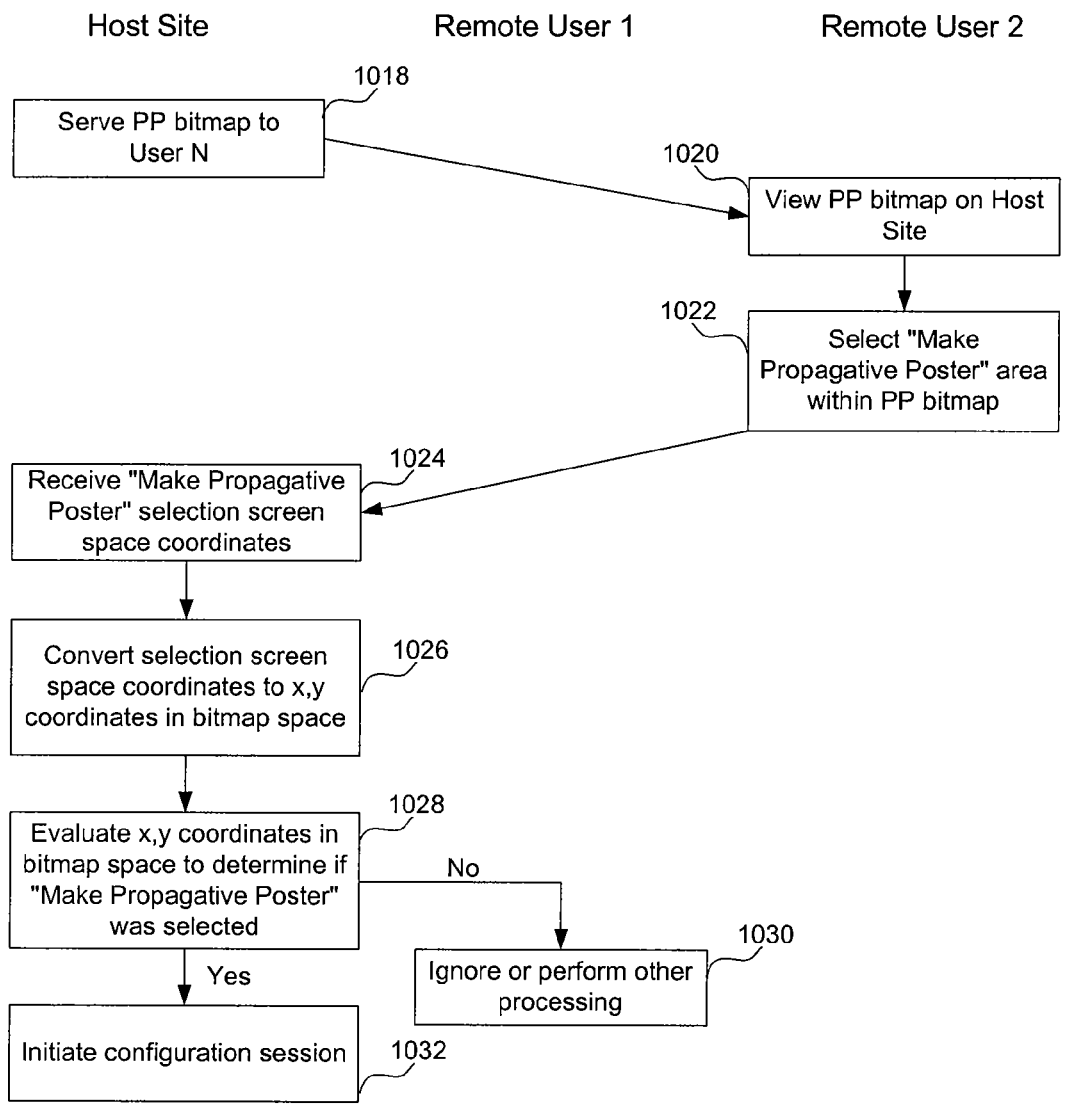

The distribution of propagative posters is further described with respect to FIGS. 10A and 10B. Remote user n (e.g. user 2) visits user 1 web page (step 1002). Remote server then interprets HTML code segment 410 (step 1004). Browser 382 is then linked to host site 302 and Web server 316. Propagative poster tracker 340 parses the originating URL (User 1's URL), and secure trackable PPID 560 (step 1006).

PP tracker 340 further tracks the referring URL of server 376. In step 1008, PP tracker 340 checks whether a valid poster ID is obtained. For example, PP tracker 340 decrypts fingerprint 540 with a copy of the private key previously stored in host site 302 and compares it with the unique poster number or ID 520 to determined if the poster ID is valid. If a valid poster ID has not been sent, then PP tracker 340 ignores the remote user n (step 1010). Otherwise, when a valid poster ID is verified, PP tracker 340 determines whether the URL of remote user n equals the originator URL of user 1 (step 1012). If the URL of remote user n is not equal then PP tracker 340 recognizes that a different user is accessing the poster and stores the URL of remote user n (step 1014) and proceeds to step 1016. Otherwise, propagative poster tracker 340 proceeds directly to step 1016.

In step 1016, propagative poster tracker 340 updates the history information of propagative poster. In particular, the history is updated to indicate that an access to the propagative poster has been made and to provide a history of the accessing URL and time stamp information. As shown in FIG. 10A, after a valid poster ID has been verified in step 1008, and the URL of the accessing remote server 376 has been evaluated in step 1012, and propagative history updated in step 1016, then propagative poster manager 310 serves the propagative poster bitmap 620 in real-time to remote user n (step 1018). Browser 382 then displays to user n the propagative poster in an overlay window (step 1020). At this time, remote user n is now viewing PP bitmap 620 on host site 302.

In step 1022, remote user n selects an input portion or "make propagative poster" area within PP bitmap 620. Browser 382 forwards this selection to host site 302. Propagative poster manager 310 receives the "make propagative poster" selection including a mouse click represented by a set of screen space coordinates (step 1024). Propagative poster manager 310 converts the selection screen space coordinates to x-y coordinates in bitmap space of the poster (step 1026). Propagative poster manager 310 then evaluates the x-y coordinates in bitmap space to determine if the "make propagative poster" was selected (step 1028). For example, if a small "make propagative poster" label is added at the bottom of a poster the x-y coordinates in bitmap space are checked to see if they correspond to the area of the small label at the bottom of the poster. If not, then PP manager 310 ignores the input or performs other processing (step 1030). If yes, then control is transferred to PP configuration module 320 to initiate a configuration session (step 1032).

E. Propagative Poster Maintenance

Figure 11:
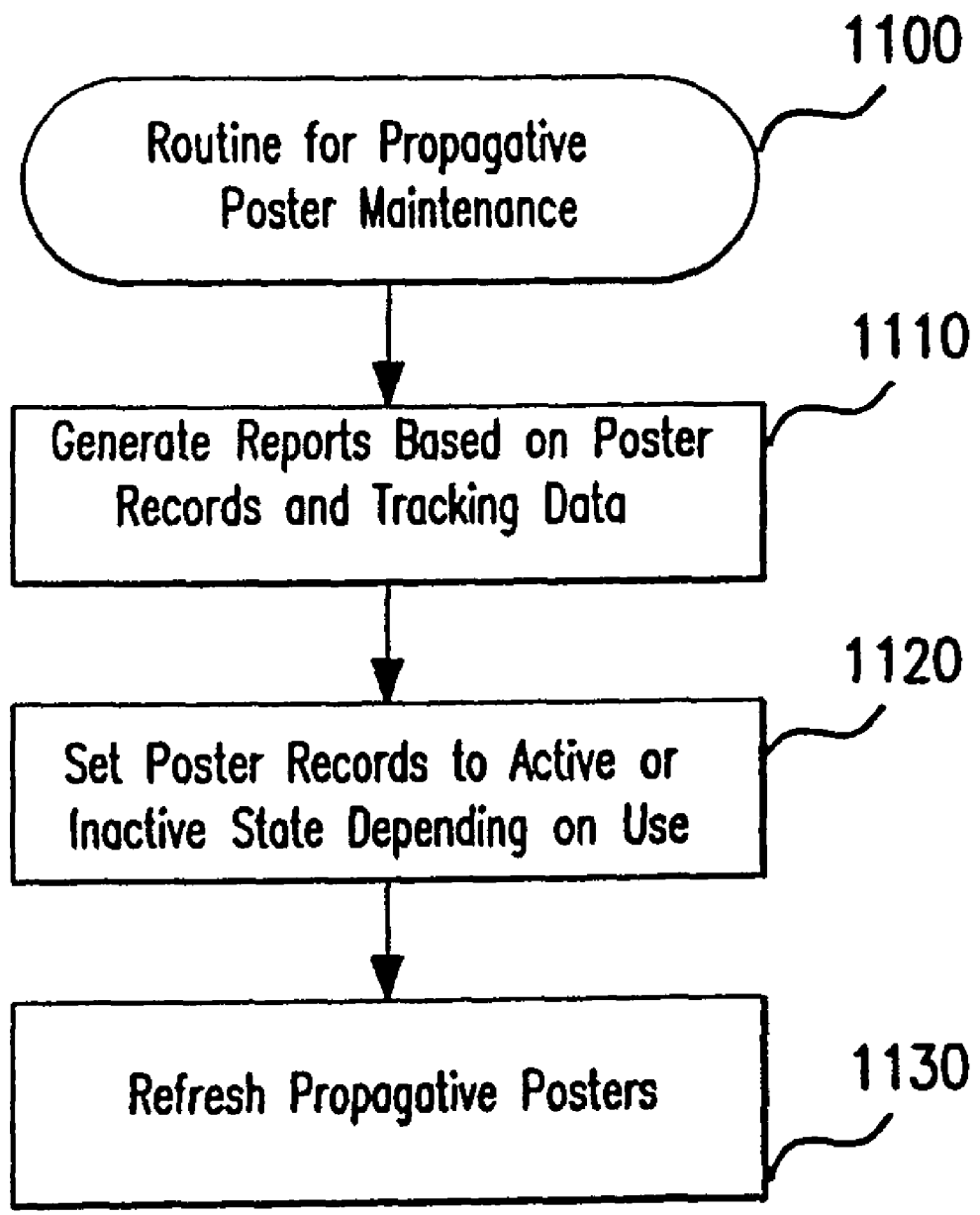
FIG. 11 is a flowchart of a routine for propagative poster maintenance according to one embodiment of the present invention.

Propagative maintenance module 350 carries out a routine for propagative poster maintenance 1100 as shown in FIG. 11. PP maintenance module 350 generates reports based on poster records and tracking data (step 1110). Any type of report can be generated based on the information in the poster records and tracking data. Such reports can include but are not limited to reports of each kind of poster that provides information on how many posters reviewed today, how many posters were clicked on today, how many posters were made today, what's the view/click ratio, what are the most active sites that view those site posters, what are the most active sites that generate mouse clicks or searches, what sites generate the most poster creations, what posters are the most popular, and what single poster identifier is on the most sites. PP maintenance module 350 also sets poster records to active or inactive state depending on use (step 1120). In particular, PP maintenance module 350 sets flag 660 in each PP record 600 to an active state when the poster has been activated on a frequent basis (i.e., at least one hit a day), or to an inactive value if the poster has not been accessed on a frequent basis.

Next, PP maintenance module 350 refreshes propagative posters (step 1130). For example, PP maintenance module

350 searches and identifies each active PP record 600 (with an active flag 660). For each active PP record 600, PP maintenance module executes the executable code 640 based on search parameters 650. Executable code 640 then generates an updated propagated poster image based on current content in database 314. An updated image of the propagated poster is then stored on storage device 312. In other words, it is rewritten over the existing bit map 620. Originator profile data 670 can also be updated based on tracked URL history and/or click-through data.

F. Example Propagative Poster Record and Tracking Information

FIG. 8 shows an example propagative poster record data structure 800 according to one example implementation of the present invention. Propagative poster record data structure includes a poster object 810, poster events object 820, poster event object type 830, poster owner object 840, poster type object 850, poster click action 860, poster click definition object 870, poster click action URL object 880, poster parameters 890, and poster parameters type object 892. Each of the objects 810 through 892 are generated and tracked for a respective propagative poster. The different fields and function of each field for each of the objects 810 through 892 is described further in corresponding tables below.

Poster object 810 includes the following fields and content as set forth in Table 1 below.

TABLE 1

| Poster Object 810 | |
|---|---|
| Field | Content |
| PosterID | unique poster identifier number |
| Encrypted ID | encrypted poster identifier |
| PosterOwner ID | unique poster owner identifier number (pointer to poster object 840) |
| PosterType ID | number identifying type of poster (e.g., job posting poster, resume poster, search button, or statistical display), GIF or TEXT version of poster, choice of color and size scheme, (pointer to poster object 850) |
| PosterURL | URL of original user that created poster |
| PosterHTML | HTML segment that is cut and pasted to propagate poster |
| GIFName | file name of stored poster (e.g., a hash coded secure, trackable ID filename with a .gif file type extension) |
| PosterCreateDate | time and date stamp of when poster was created by originator |
| Active | active/inactive flag |
| PosterParamsID | number identifying poster search parameters (pointer to poster object 890) |
| PosterClickActionID | number identifying poster click action parameters (pointer to poster object 860) |

Poster events object 820 includes the following fields and content shown in Table 2 below.

TABLE 2

| Poster Events Object 820 | |
|---|---|
| Field | Content |
| PosterEventsID | event number |
| PosterID | unique poster number |
| PosterEventTypeID | number identifying type of poster event (pointer to poster object 830) |

TABLE 2-continued

| Poster Events Object 820 | |
|---|---|
| Field | Content |
| ReferringURL | URL address of site that accessed or "hit" poster |
| EventDate | time and date stamp of hit on poster |

Poster event type object 830 has fields and content as shown below in Table 3.

TABLE 3

| Poster Event Type Object 830 | |
|---|---|
| Field | Content |
| PosterEventTypeID | number identifying type of poster event |
| PosterEventDescriptionID | textual description of poster event (e.g., poster hit, poster viewed for length of time) |

Poster owner object 840 includes the following fields and content as set forth in Table 4.

TABLE 4

| Poster Owner Object 840 | |
|---|---|
| Field | Content |
| Poster Owner ID | unique poster owner identifier number |
| PosterOwnerName | name of originator of poster |
| PosterOwnerEmail | email address of originator of poster |

Poster type object 850 has the following fields and content provided in Table 5.

TABLE 5

| Poster Object Type 850 | |
|---|---|
| Field | Content |
| PosterTypeID | number identifying type of poster (e.g., job posting poster, resume poster, search button, or statistical display), GIF or TEXT version of poster, choice of color and size scheme. |
| PosterType Description | textual description of type of poster (e.g., job posting poster, resume poster, search button, or statistical display), GIF or TEXT version of poster, choice of color and size scheme. |
| PosterClick DefID | number identifying which area corresponds to an input portion on poster for making another propagation poster (pointer to poster object 870) |

Poster click action object 860 includes the following fields and content as shown in Table 6.

TABLE 6

| Poster Click Action Object 860 | |
|---|---|
| Field | Content |
| PosterClick ActionID | number identifying poster click action parameters |
| PosterClickDefID | number identifying poster click action parameters (pointer to poster object 870) |

TABLE 6-continued

Poster Click Action Object 860

| Field | Content |
| --- | --- |
| PosterAreaNumber1 | area number of poster (e.g., one of three areas where banner ads can be placed) |
| ActionURL | URL |

Poster click define object 870 has the following fields and content shown in Table 7. Note points (x1,y1) and (x2,y2) can be two points defining a rectangle (or square) area on a web page in bitmap space. In one embodiment, this set of points defines an input portion where a user clicks to propagate another poster.

TABLE 7

Poster Click Define Object 870

| Field | Content |
| --- | --- |
| PosterClickDefID | number identifying poster click action parameters |
| X1 | x coordinate of first point in bit map space |
| Y1 | y coordinate of second point in bit map space |
| X2 | x coordinate of second point in bit map space |
| Y2 | y coordinate of second point in bit map space |
| PosterAreaNumber | area number of poster (e.g., one of three areas where banner ads can be placed) |
| PosterEventTypeID | number identifying type of poster event (pointer to poster object 830) |
| PosterClickAction URL | number identifying type of poster click action (pointer to poster object 880) |

Poster click action URL 880 includes the following fields and content as shown in Table 8.

TABLE 8

Poster Click Action URL Object 880

| Field | Content |
| --- | --- |
| PosterClickActionURLID | number identifying type of poster click action URL |
| ActionURL | URL |

Poster parameters object 890 includes the following fields and contents and shown in Table 9.

TABLE 9

Poster Parameters Object 890

| Field | Content |
| --- | --- |
| PosterParametersID | number identifying type of poster search parameters (pointer to poster object 892) |
| ParametersTypeID | number identifying type of poster search |
| ParameterValue | value of type of poster search |

Poster parameters type object 892 includes the following fields and content as shown in Table 10.

TABLE 10

Poster Parameters Type Object 892

| Field | Content |
| --- | --- |
| ParamsTypeID | number identifying type of poster search |
| ParamsDescription | textual description of search parameters |

Note other information can be tracked including client side variables, such as, screen depth, screen width, platform type, browser, and plug-ins installed on client.

Such information and tracking is optional depending upon a particular application or preference of an administrator of propagative poster manager 310.

G. Detailed Viewing of Information Concerning Data Summarized on a Propagative Poster As noted above, a feature of the present invention permits users to click on (i.e., select) summary information displayed on a propagative poster to access further information about a selected item or topic. In other words, a propagative poster allows a user to select summary information about an item or topic displayed on the propagative poster to thereby access further information about that selected item or topic.

In the context of a list of resumes, for example, a user can access details about a resume that looks interesting simply by clicking on a summary of the desired resume displayed in a list of resumes on a propagative poster. As described in the above sections, propagative poster manager 310 converts the selection screen space coordinates to x-y coordinates in bitmap space of the poster. Propagative poster manager 310 then evaluates the x-y coordinates in bitmap space to determine which resume summary was selected. The system then presents more detailed data corresponding to the resume summary from some host site to the user.

IV. Example Environment

The present invention can be implemented in any communication network, such as, the Internet, which supports interactive services and applications. In particular, the present invention can be implemented in any Web service, preferably a Web service supporting secure transactions, such as, the Secure Socket Layer (SSL) protocol and/or using a Secure HyperText Transport Protocol (S-HTTP). In one example, the present invention is implemented in a multi-platform (platform independent) programming language such as Java 1.1. Java-enabled browsers are used, such as, Netscape, HotJava, and Microsoft Explorer browsers. Active content Web pages can be used. Such active content Web pages can include Java applets or ActiveX controls, or any other active content technology developed now or in the future. The present invention, however, is not intended to be limited to Java or Java-enabled browsers, and can be implemented in any programming language and browser, developed now or in the future, as would be apparent to a person skilled in the art given this description.

FIG. 12A is a diagram of an example internet work environment according to the present invention. FIG. 12A shows a communication network or combination of networks (Internet) 1200 which can support the invention. Internet 1200 consists of interconnected computers which supports communication between many different types of users including businesses, universities, individuals, government, and financial institutions. Internet 1200 supports many different types of communication links implemented in a variety of architectures. For example, voice and data links can be used including phone, paging, cellular, and cable TV (CATV) links. Terminal equipment can include local area networks, personal computers with modems, content servers of multi-media, audio, video, and other information, pocket organizers, Personal Data Assistants (PDAs), and set-top boxes.

Figure 12B:
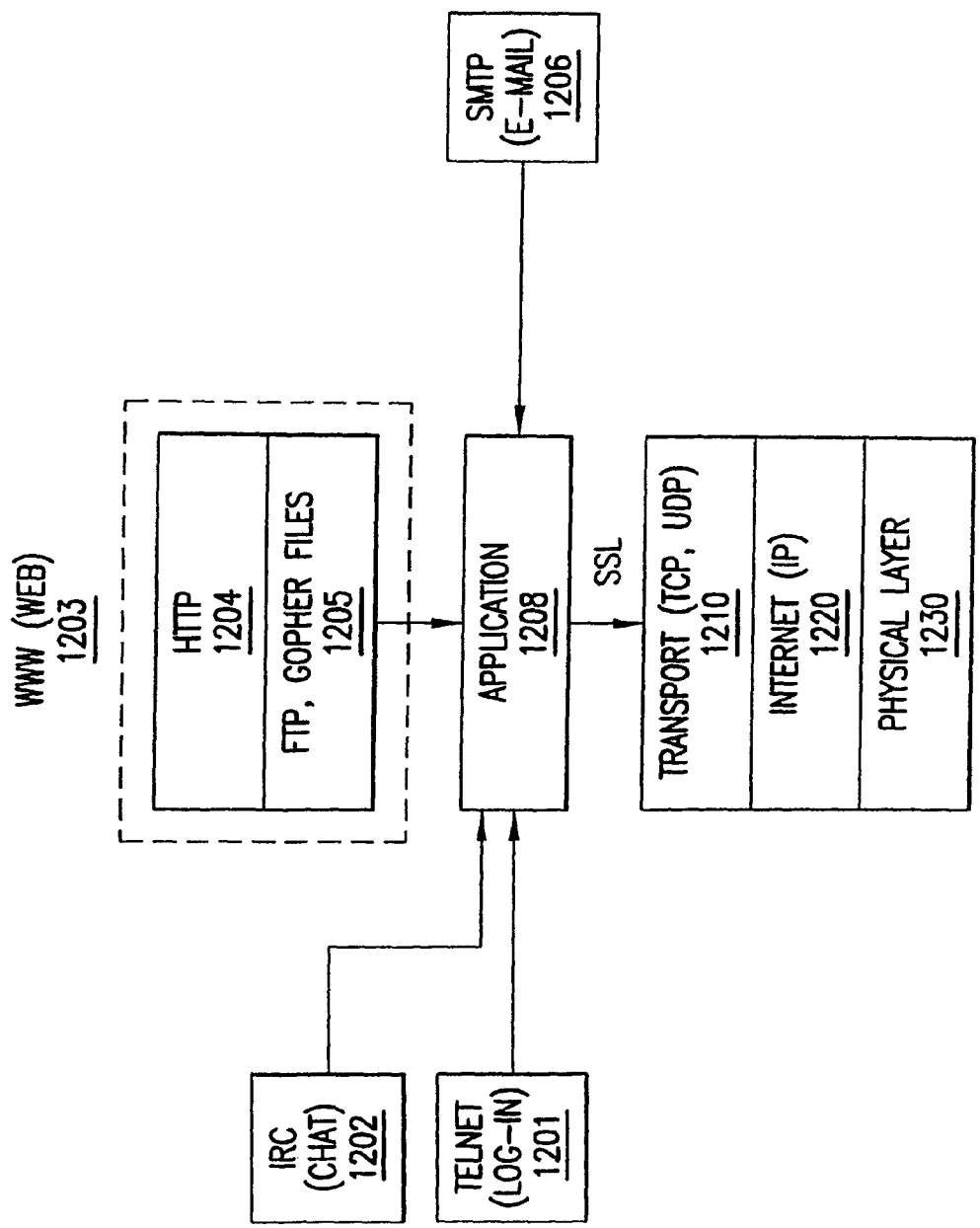
FIG. 12B shows a simplified four-layered communication model supporting Web commerce

Communication over a communication network, such as Internet 1200, is carried out through different layers of communication. FIG. 12B shows a simplified four-layered communication model supporting Web commerce including an application layer 1208, transport layer 1210, Internet layer 1220, physical layer 1230. As would be apparent to a person skilled in the art, in practice, a number of different layers can be used depending upon a particular network design and communication application. Application layer 1208 represents the different tools and information services which are used to access the information over the Internet. Such tools include, but are not limited to, telenet log-in service 1201, IRC chat 1202, Web service 1203, and SMTP (Simple Mail Transfer Protocol) electronic mail service 1206. Web service 1203 allows access to HTTP documents 1204, and FTP and Gopher files 1205. A Secure Socket Layer (SSL) is an optional protocol used to encrypt communications between a Web browser and Web server.

Description of the example environment in these terms is provided for convenience only. It is not intended that the invention be limited to application in this example environment. In fact, after reading the following description, it will become apparent to a person skilled in the relevant art how to implement the invention in alternative environments.

V. Example Computer System

Figure 12C:
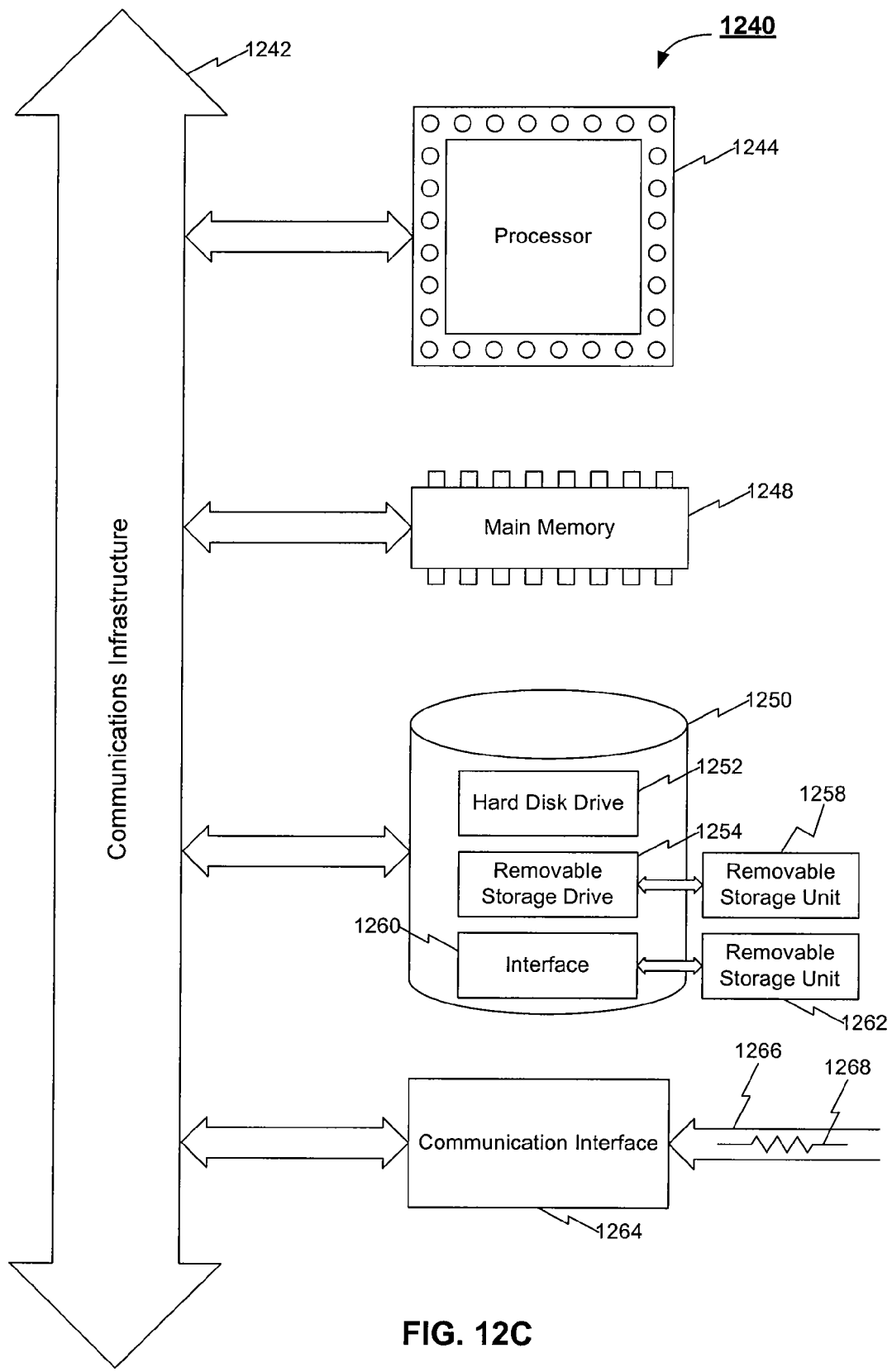
FIG. 12C is a block diagram of a computer system according to an example implementation of the present invention.

An example of a computer system 1240 is shown in FIG. 12C. The computer system 1240 represents any single or multi-processor computer. Single-threaded and multi-threaded computers can be used. Unified or distributed memory systems can be used.

Computer system 1240 includes one or more processors, such as processor 1244. One or more processors 1244 can execute software implementing routine 100 as described above. Each processor 1244 is connected to a communication infrastructure 1242 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1240 also includes a main memory 1248, preferably random access memory (RAM), and can also include a secondary memory 1250. The secondary memory 1250 can include, for example, a hard disk drive 1252 and/or a removable storage drive 1254, representing a floppy disk drive, a magnetic tape drive, an optical disk drive, etc. The removable storage drive 1254 reads from and/or writes to a removable storage unit 1258 in a well known manner. Removable storage unit 1258 represents a floppy disk, magnetic tape, optical disk, etc., which is read by and written to by removable storage drive 1254. As will be appreciated, the removable storage unit 1258 includes a computer usable storage medium having stored therein computer software and/or data.

In alternative embodiments, secondary memory 1250 may include other similar means for allowing computer programs or other instructions to be loaded into computer system 1240. Such means can include, for example, a removable storage unit 1262 and an interface 1260. Examples can include a program cartridge and cartridge interface (such as that found in video game devices), a removable memory chip (such as an EPROM, or PROM) and associated socket, and other removable storage units 1262 and interfaces 1260 which allow software and data to be transferred from the removable storage unit 1262 to computer system 1240.

Computer system 1240 can also include a communications interface 1264. Communications interface 1264 allows software and data to be transferred between computer system 1240 and external devices via communications path 1266. Examples of communications interface 1264 can include a modem, a network interface (such as Ethernet card), a communications port, etc. Software and data transferred via communications interface 1264 are in the form of signals which can be electronic, electromagnetic, optical or other signals capable of being received by communications interface 1264, via communications path 1266. Note that communications interface 1264 provides a means by which computer system 1240 can interface to a network such as the Internet.

The present invention can be implemented using software running (that is, executing) in an environment similar to that described above with respect to FIG. 12A. In this document, the term "computer program product" is used to generally refer to removable storage unit 1254, a hard disk installed in hard disk drive 1252, or a carrier wave carrying software over a communication path 1266 (wireless link or cable) to communication interface 1264. A computer useable medium can include magnetic media, optical media, or other recordable media, or media that transmits a carrier wave or other signal. These computer program products are means for providing software to computer system 1240.

Computer programs (also called computer control logic) are stored in main memory 1248 and/or secondary memory 1250. Computer programs can also be received via communications interface 1264. Such computer programs, when executed, enable the computer system 1240 to perform the features of the present invention as discussed herein. In particular, the computer programs, when executed, enable the processor 1244 to perform the features of the present invention. Accordingly, such computer programs represent controllers of the computer system 1240.

The present invention can be implemented as control logic in software, firmware, hardware or any combination thereof. In an embodiment where the invention is implemented using software, the software may be stored in a computer program product and loaded into computer system 1240 using removable storage drive 1254, hard drive 1252, or interface 1260. Alternatively, the computer program product may be downloaded to computer system 1240 over communications path 1266. The control logic (software), when executed by the one or more processors 1244, causes the processor(s) 1244 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

VI. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for propagating a poster of host site content, from a host site to remote clients over the World Wide Web, comprising:
 hosting a configuration session at the host site, in real time, comprising:
  receiving, by the host site, input from a first remote client that is used to configure at the host site a propagative poster of host site content based on at least one configuration selection input at the first remote client;
  generating, by the host site, a propagative poster identifier that references the propagative poster configured at the host site by the first remote client;
  generating, by the host site, a Web code segment that includes the propagative poster identifier and link information to the host site; and
  forwarding the Web code segment by the host site to the first remote client,
 wherein the Web code segment is configured to be inserted into a Web page at the first remote client, in real time, to create on the Web page at the first remote client a link from the Web page at the first remote client to the propagative poster of host site content at the host site.

2. The method of claim 1, further comprising:
 establishing at the host site a Web connection from a second remote client to the propagative poster configured at the host site by the first remote client in response to an input at the Web page at the first remote client by the second remote client that selects at least a portion of the Web page at the first remote client corresponding to the Web code segment.

3. The method of claim 2, wherein the at least one configuration selection input by the first remote client includes a search query of host site content for at least one search parameter,
 wherein the method further comprises periodically executing the search query of host site content based on the at least one search parameter to obtain an updated search result; and
 wherein said establishing at the host site a Web connection from the second remote client to the propagative poster configured by the first remote client comprises connecting the second remote client to the propagative poster including the updated search result.

4. The method of claim 2, wherein the at least one configuration selection input by the first remote client includes a search query of host site content for at least one search parameter; and
 wherein said establishing at the host site a Web connection from the second remote client to the propagative poster comprises executing the search query of host site content based on the at least one search parameter to obtain a current search result, and the propagative poster includes the current search result.

5. The method of claim 2, further comprising:
 transmitting, by the host site to the second remote client, data configured to display the propagative poster configured at the host site by the first remote client in an overlay window within a display view of a browser of the second remote client.

6. The method of claim 2, further comprising:
 hosting a second configuration session at the host site, in real time, comprising receiving, by the host site, input from the second remote client to configure at the host site a second propagative poster of host site content based on at least one configuration selection input at the second remote client.

7. The method of claim 6, wherein the propagative poster configured at the host site by the first remote client includes an input portion configured to receive input from the second remote client to configure at the host site the second propagative poster, the method further comprising initiating said hosting a second configuration session in response to an input by the second remote client selecting the input portion of the first propagative poster.

8. The method of claim 1, wherein said hosting a configuration session further comprises:
 transmitting, by the host site to the first remote client, data configured to display a first configuration screen that includes at least one sample propagative poster that is configurable by input from the first remote client, wherein the at least one sample propagative poster includes text, an image, or both;
 receiving, by the host site, input from the first remote client that elects one of the at least one sample propagative poster;
 transmitting, by the host site to the first remote client, data configured to display a second configuration screen that includes a template configured to receive input from the first remote client to configure the selected sample propagative poster at the host site; and
 receiving, by the host site, input from the first remote client corresponding to the template, the input representing configuration selections input by the first remote client.

9. The method of claim 8, further comprising:
 transmitting, by the host site to the first remote client, data configured to display a third configuration screen that includes the propagative poster configured at the host site by the first remote client.

10. The method of claim 9, wherein the Web code segment comprises a HTML code segment configured to connect a browser to the host site and display the propagative poster configured at the host site; wherein said forwarding the Web code segment to the first remote client comprises transmitting to the first remote client data configured to display a fourth configuration screen that includes the HTML code segment; and wherein the HTML code segment is configured to be copied from the fourth configuration screen displayed by the browser to the Web page at the first remote client.

11. The method of claim 1, wherein said forwarding the Web code segment to the first remote client comprises forwarding data configured to automatically insert the Web code segment into the Web page at the first remote client.

12. The method of claim 1, wherein said generating a propagative poster identifier includes generating a unique propagative poster number.

13. The method of claim 1, wherein said generating a propagative poster identifier includes:
 passing a respective private key and a unique propagative poster number of the first remote client through a hash function to obtain a secure fingerprint.

14. The method of claim 1, further comprising:
 storing a propagative poster record that includes information related to the propagative poster configured at the host site.

15. The method of claim 14, wherein said storing a propagative poster record comprises storing fields of information related to the propagative poster including at least: the propagative poster identifier, a bitmap, the Web code segment, an executable code, at least one search parameter, an active/inactive flag, and originator profile data.

16. The method of claim 1, further comprising tracking URL addresses of servers with Web pages that contain the Web code segment including the link to the propagative poster configured at the host site.

17. The method of claim 1, further comprising:
receiving, by the host site, a request from a second remote client to establish a Web connection to the host site and the propagative poster configured at the host site by the first remote client; and
determining whether the request includes a valid propagative poster identifier to access the propagative poster configured at the host site by the first remote client.

18. The method of claim 1, further comprising:
converting a pair of screen space coordinates of an input from a second remote client to a pair of coordinates (x,y) in bitmap space;
determining whether the coordinates (x,y) in bitmap space correspond to an input portion of the propagative poster configured by the first remote client; and
in response to determining that the coordinates (x,y) in bitmap space correspond to the input portion of the propagative poster configured by the first remote client, either
hosting a second configuration session at the host site, in real time, including receiving, by the host site, input from the second remote client to configure a second propagative poster at the host site, or
transmitting by the host site, for display at the second remote client, detailed information from the host site content related to summary information displayed at the input portion corresponding to the pair of coordinates (x,y) in bitmap space.

19. The method of claim 1, further comprising:
setting, by the host site, a flag that indicates whether the propagative poster configured at the host site by the first remote client is active or inactive based on a number of accesses made to the propagative poster by the first remote client or other remote clients; and
responsive to determining that the flag is set to indicate the propagative poster configured at the host site is active, periodically executing, by the host site, code corresponding to the propagative poster configured at the host site by the first remote client, to generate an updated bitmap image of the propagative poster according to current data at the host site.

20. The method of claim 1, further comprising generating, by the host site, a report based on data in a propagative poster record corresponding to the propagative poster configured at the host site.

21. The method of claim 1, wherein the Web code segment includes a copy of the propagative poster of host site content.

22. A system for propagating a poster of host site content, from a host site to remote clients over the World Wide Web, comprising:
means for hosting a configuration session at the host site, in real time, including:
means for receiving at the host site input from a first remote client to configure at the host site a propagative poster of host site content based on at least one configuration selection input by the first remote client;
means for generating at the host site a propagative poster identifier that references the propagative poster configured at the host site by the first remote client;
means for generating at the host site a Web code segment that includes the propagative poster identifier and link information to the host site; and
means for forwarding the Web code segment from the host site to the first remote client,
wherein the Web code segment is configured to be inserted into a Web page at the first remote client to create on the Web page at the first remote client a link from the Web page at the first remote client to the propagative poster of host site content at the host site.

23. The system of claim 22, further comprising:
means for establishing, at the host site, a Web connection, from a second remote client to the propagative poster configured at the host site by the first remote client, in response to an input at the Web page at the first remote client by the second remote client that selects at least a portion of the Web page at the first remote client corresponding to the Web code segment.

24. The system of claim 23, wherein the at least one configuration selection input by the first remote client includes a search query of host site content for at least one search parameter,
wherein the system further comprises means for periodically executing the search query of host site content based on the at least one search parameter to obtain an updated search result; and
wherein said means for establishing at the host site a Web connection from the second remote client to the propagative poster establishes a connection with the propagative poster including the updated search result.

25. The system of claim 23, wherein the at least one configuration selection input by the first remote client includes a search query of host site content for at least one search parameter; and
wherein said means for establishing at the host site a Web connection from the second remote client to the propagative poster executes the search query of host site content based on the at least one search parameter to obtain a current search result, and the propagative poster includes the current search result.

26. The system of claim 23, further comprising:
means for transmitting, from the host site, data configured to display the propagative poster in an overlay window within a display view of a browser at the second remote client.

27. The system of claim 23, further comprising:
means for hosting a second configuration session at the host site, in, real time, including:
means for receiving at the host site input from the second remote client to configure a second propagative poster of host site content based on at least one configuration selection input by the second remote client.

28. The system of claim 27, wherein the propagative poster configured at the host site by the first remote client includes an input portion configured to receive input from the second remote client to configure the second propagative poster, and the system further comprises means for initiating hosting the second configuration session in response to an input by the second remote client selecting the input portion of the first propagative poster.

29. The system of claim 22, wherein said means for hosting a configuration session includes:
means for transmitting, from the host site, data configured to display at the first remote client a first configuration screen including at least one sample propagative poster that is configurable by input from the first remote client, wherein the at least one sample propagative poster includes either text, an image, or both;
means for receiving, at the host site, input from the first remote client that selects one of the at least one sample propagative poster;

means for transmitting, from the host site, data configured to display at the first remote client a second configuration screen including a template configured to receive input from the first remote client to configure the selected one of the at least one sample propagative poster at the host site; and means for receiving, at the host site, input from the first remote client corresponding to the template, the input representing configuration selections input by the first remote client.

30. The system of claim 29, farther comprising:
means for transmitting, from the host site to the first remote client, data configured to display a third configuration screen including the propagative poster configured at the host site by the first remote client.

31. The system of claim 30, wherein the Web code segment comprises a HTML code segment configured to connect a browser to the host site and display the propagative poster configured at the host site; wherein said means for forwarding the Web segment transmits, from the host site to the first remote client, data configured to display a fourth configuration screen including the HTML code segment; and wherein the HTML code segment is configured to be copied from the fourth configuration screen displayed by the browser to the Web page at the first remote client.

32. The system of claim 22, wherein said means for generating a Web code configures the Web code segment for automatic insertion into the Web page at the first remote client.

33. The system of claim 22, wherein said means for generating a propagative poster identifier includes means for generating a unique propagative poster number.

34. The system of claim 22, wherein said means for generating a propagative poster identifier includes:
means for passing a respective private key and a unique propagative poster number of the first remote client through a hash function to obtain a secure fingerprint.

35. The system of claim 22, further comprising:
means for storing a propagative poster record that includes information related to the propagative poster configured at the host site.

36. The system of claim 35, wherein said means for storing stores fields of information related to the propagative poster including at least: the propagative poster identifier, a bitmap, the Web code segment, an executable code, at least one search parameter, an active/inactive flag, and originator profile data.

37. The system of claim 22, further comprising means for tracking URL addresses of servers with Web pages that contain the Web code segment including the link to the propagative poster configured at the host site.

38. The system of claim 22, further comprising:
means for receiving, at the host site, a request to establish a Web connection to the host site and the propagative poster configured at the host site by the first remote client; and
means for determining, at the host site, whether the request includes a valid propagative poster identifier to access the propagative poster configured at the host site by the first remote client.

39. The system of claim 22, farther comprising:
means for converting a pair of screen space coordinates of an input from a second remote client to a pair of coordinates (x,y) in bitmap space;
means for determining whether the coordinates (x,y) in bitmap space correspond to an input portion of the propagative poster configured at the host site by the first remote client; and means, responsive to determining that the coordinates (x,y) in bitmap space correspond to the input portion of the propagative poster, for either
hosting a second configuration session at the host site, in real time, including receiving, at the host site, input from the second remote client to configure a second propagative poster at the host site, or
transmitting from the host site, for display at the second remote client, detailed information from the host site content related to summary information displayed at the input portion corresponding to the pair of coordinates (x,y) in bitmap space.

40. The system of claim 22, further comprising:
means for setting, at the host site, a flag that indicates whether the propagative poster configured at the host site by the first remote client is active or inactive based on a number of accesses made to the propagative poster by the first remote client or other remote clients; and
means for determining that the flag is set to indicate the propagative poster configured at the host site is active and, responsive thereto, periodically executing, at the host site, code corresponding to the propagative poster configured at the host site by the first remote client, to obtain an updated bitmap image of the propagative poster according to current data at the host site.

41. The system of claim 22, further comprising:
means for generating, at the host site, a report based on data in a propagative poster record corresponding to the propagative poster configured at the host site.

42. The system of claim 22, wherein the Web code segment includes a copy of the propagative poster of host site content.

43. A system for managing propagation of host site content to remote clients over the World Wide Web, comprising:
a host site including:
at least one processor and memory;
a propagative poster configuration module that hosts a configuration session at the host site, in real time, including receiving input from a first remote client to configure at the host site a propagative poster of host site content based on at least one configuration selection input at the first remote client; and
a propagative poster generator that generates, at the host site, a propagative poster identifier and a Web code segment, wherein the propagative poster identifier references the propagative poster configured at the host site by the first remote client, and the Web code segment includes the propagative poster identifier and link information to the host site, wherein the propagative poster generator is configured to forward the Web code segment from the host site to the first remote client, in real-time, and wherein the Web code segment is configured to be inserted into a Web page at the first remote client to create on the Web page at the first remote client a link from the Web page at the first remote client to the propagative poster of host site content at the host site.

44. The system of claim 43, wherein said propagative poster generator further establishes at the host site a Web connection from a second remote client to the propagative poster configured at the host site by the first remote client in response to an input at the Web page at the first remote client by the second remote client that selects at least a portion of the Web page at the first remote client corresponding to the Web code segment.

45. The system of claim 44, wherein the at least one configuration selection input by the first remote client includes a search query of host site content for at least one search parameter, wherein said propagative poster generator executes the search query of host site content based on the at least one search parameter to obtain a search result, and wherein the propagative poster configured at the host site includes the search result.

46. The system of claim 44, wherein said propagative poster configuration module further hosts at the host site a second configuration session, including receiving input from the second remote client to configure at the host site a second propagative poster of host site content based on at least one configuration selection input at the second remote client.

47. The system of claim 43, wherein said propagative poster configuration module transmits data configured to display at the first remote client a first configuration screen that includes at least one sample propagative poster that is configurable by input from the first remote client, receives input from the first remote client that selects one of the at least one sample propagative poster, transmits data configured to display at the first remote client a second configuration screen that includes a template configured to receive input from the first remote client to configure the selected sample propagative poster at the host site, and receives input from the first remote client corresponding to the template, the input representing configuration selections input by the first remote client.

48. The system of claim 47, wherein said propagative poster configuration module transmits data configured to display at the first remote client a third configuration screen that includes the propagative poster configured at the host site by the first remote client.

49. The system of claim 43, wherein said propagative poster generator generates a unique propagative poster number.

50. The system of claim 43, wherein said propagative poster generator further comprises a hash function generator that receives a respective private key and a unique propagative poster number, and outputs a secure fingerprint; and wherein said propagative poster generator concatenates the secure fingerprint and the URL of the first remote client to obtain the propagative poster identifier.

51. The system of claim 43, wherein the memory stores fields of information related to the propagative poster configured at the host site including at least: the propagative poster identifier, a bitmap, the Web code segment, an executable code, and originator profile data.

52. The system of claim 43, further comprising:
a database that stores a propagative poster record that includes information related to the propagative poster configured at the host site.

53. The system of claim 52, further comprising a propagative poster tracker that tracks URL addresses of remote clients accessing the propagative poster configured at the host site.

54. The system of claim 53, further comprising a propagative poster maintenance module that generates a report based on at least one propagative poster record and data tracked by the propagative poster tracker.

55. The system of claim 43, wherein the Web code segment includes a copy of the propagative poster of host site content.

56. A computer readable storage medium having stored thereon computer-executable instructions, execution of which by a processing device causes the processing device to perform operations for propagating host site content to remote clients over the World Wide Web, in real-time, the operations comprising:
hosting a configuration session at a host site including the processing device, in real time, comprising:
receiving, at the host site, input from a first remote client to configure at the host site a propagative poster of host site content based on at least one configuration selection input at the first remote client;
generating, at the host site, a propagative poster identifier that references the propagative poster configured at the host site by the first remote client;
generating, at the host site, a Web code segment that includes the propagative poster identifier and link information to the host site; and
forwarding the Web code segment from the host site to the first remote client,
wherein the Web code segment is configured to be inserted into a Web page at the first remote client, in real time, to create on the Web page at the first remote client a link from the Web page at the first remote client to the propagative poster of host site content at the host site.

57. The computer readable storage medium of claim 56, wherein the Web code segment includes a copy of the propagative poster of host site content.

* * * * *

UNITED STATES PATENT AND TRADEMARK OFFICE
CERTIFICATE OF CORRECTION

PATENT NO.        : 8,266,242 B2
APPLICATION NO.   : 11/436094
DATED             : September 11, 2012
INVENTOR(S)       : Foulger et al.

It is certified that error appears in the above-identified patent and that said Letters Patent is hereby corrected as shown below:

ON THE TITLE PAGE:

On Page 3, item (56), under "OTHER PUBLICATIONS", in Column 1, Line 16, delete "John." and insert -- John, --, therefor.

On Page 3, item (56), under "OTHER PUBLICATIONS", in Column 1, Line 17, delete "Intermediary"" and insert -- Intermediary", --, therefor.

On Page 3, item (56), under "OTHER PUBLICATIONS", in Column 1, Line 20, delete "al. A" and insert -- al., "A --, therefor.

On Page 3, item (56), under "OTHER PUBLICATIONS", in Column 1, Line 21, delete "Web," and insert -- Web," --, therefor.

On Page 3, item (56), under "OTHER PUBLICATIONS", in Column 1, Line 22, delete "Intelligent" and insert -- "Intelligent --, therefor.

On Page 3, item (56), under "OTHER PUBLICATIONS", in Column 1, Line 23, delete "Internet," and insert -- Internet," --, therefor.

On Page 3, item (56), under "OTHER PUBLICATIONS", in Column 1, Line 24, delete "Deborah" and insert -- Deborah, --, therefor.

On Page 3, item (56), under "OTHER PUBLICATIONS", in Column 1, Line 26, delete "pp. 1-3." and insert -- pp. 1-3]. --, therefor.

On Page 3, item (56), under "OTHER PUBLICATIONS", in Column 1, Line 29, delete "Don "E-Business Starting Gate" Wall Street Journal" and insert -- Don, "E-Business Starting Gate", Wall Street Journal, --, therefor.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,266,242 B2

On Page 3, item (56), under "OTHER PUBLICATIONS", in Column 1, Line 50, delete "al. Mobile" and insert -- al., "Mobile --, therefor.

On Page 3, item (56), under "OTHER PUBLICATIONS", in Column 1, Line 51, delete "dual-band," and insert -- dual-band", --, therefor.

On Page 3, item (56), under "OTHER PUBLICATIONS", in Column 2, Line 1, delete "al. Geographic Data Processing." and insert -- al., "Geographic Data Processing", --, therefor.

On Page 3, item (56), under "OTHER PUBLICATIONS", in Column 2, Line 17, delete "al." and insert -- al., --, therefor.

On Page 3, item (56), under "OTHER PUBLICATIONS", in Column 2, Line 20, delete "Mario" and insert -- Mario, --, therefor.

On Page 3, item (56), under "OTHER PUBLICATIONS", in Column 2, Line 21, delete "Ediburgh," and insert -- Edinburgh, --, therefor.

On Page 3, item (56), under "OTHER PUBLICATIONS", in Column 2, Line 42, delete "Toursim" and insert -- Tourism --, therefor.

On Page 3, item (56), under "OTHER PUBLICATIONS", in Column 2, Line 45, delete "594-604" and insert -- 594-604. --, therefor.

IN THE DRAWINGS:

In Fig. 6, Sheet 9 of 23, in Box "620", in Line 1, delete "BIT MAP" and insert -- BITMAP --, therefor.

Figure 14A:
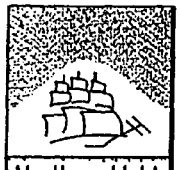

In Fig. 14A, Sheet 21 of 23, in Line 7, delete "Northen" and insert -- Northern --, therefor.

In Fig. 14A, Sheet 21 of 23, in Line 34, delete "Northen" and insert -- Northern --, therefor.

In Fig. 14B, Sheet 22 of 23, in Line 8, delete "Northen" and insert -- Northern --, therefor.

In Fig. 14B, Sheet 22 of 23, in Line 16, delete "Northen" and insert -- Northern --, therefor.

In Fig. 14B, Sheet 22 of 23, in Line 24, delete "Northen" and insert -- Northern --, therefor.

IN THE SPECIFICATIONS:

CERTIFICATE OF CORRECTION (continued)
U.S. Pat. No. 8,266,242 B2

In Column 4, Line 36, delete "bit map," and insert -- bitmap, --, therefor.

In Column 11, Line 8, delete "(e.g," and insert -- (e.g., --, therefor.

In Column 11, Line 17, delete "operators," and insert -- operators, or --, therefor.

In Column 13, Line 8, delete "bit map" and insert -- bitmap --, therefor.

In Column 15, Line 25, in "TABLE 7", delete "bit map" and insert -- bitmap --, therefor.

In Column 15, Line 27, in "TABLE 7", delete "bit map" and insert -- bitmap --, therefor.

In Column 15, Line 29, in "TABLE 7", delete "bit map" and insert -- bitmap --, therefor.

In Column 15, Line 31, in "TABLE 7", delete "bit map" and insert -- bitmap --, therefor.

IN THE CLAIMS:

In Column 20, Line 19, in Claim 8, delete "elects" and insert -- selects --, therefor.

In Column 23, Line 11, in Claim 30, delete "farther" and insert -- further --, therefor.

In Column 23, Line 20, in Claim 31, delete "segment" and insert -- code segment --, therefor.

In Column 23, Line 60, in Claim 39, delete "farther" and insert -- further --, therefor.